United States Patent
Yoshida et al.

[11] Patent Number: 5,959,741
[45] Date of Patent: *Sep. 28, 1999

[54] FACSIMILE APPARATUS FOR PROCESSING RECEIVED IMAGE DATA ACCORDING TO SUB-ADDRESS SIGNAL

[75] Inventors: Takehiro Yoshida, Tokyo; Hiroshi Nobuta, Yokohama; Shinichiro Kori; Makoto Kobayashi, both of Kawasaki; Koichiro Otsuka, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/763,086

[22] Filed: Dec. 10, 1996

Related U.S. Application Data

[63] Continuation of application No. 08/348,059, Dec. 1, 1994.

[30] Foreign Application Priority Data

| Dec. 6, 1993 | [JP] | Japan | 5-305302 |
| Dec. 14, 1993 | [JP] | Japan | 5-313621 |
| Mar. 4, 1994 | [JP] | Japan | 6-059949 |
| Apr. 14, 1994 | [JP] | Japan | 6-100658 |

[51] Int. Cl.⁶ .................................................. H04N 1/21
[52] U.S. Cl. ........................................ 358/440; 358/441
[58] Field of Search ........................... 358/440, 402–403, 358/407, 434–435, 441

[56] References Cited

U.S. PATENT DOCUMENTS

| 3,920,896 | 11/1975 | Bishop et al. | 358/440 |
| 5,216,517 | 6/1993 | Kinoshita et al. | 358/400 |
| 5,251,044 | 10/1993 | Ikegaya | 358/440 |
| 5,274,467 | 12/1993 | Takehiro et al. | 358/402 |
| 5,521,719 | 5/1996 | Yamada | 358/438 |
| 5,682,248 | 10/1997 | Yoshida | 358/404 |

FOREIGN PATENT DOCUMENTS

| 0371726 | 6/1990 | European Pat. Off. . |
| 0428254 | 5/1991 | European Pat. Off. . |
| 2089620 | 6/1982 | United Kingdom . |

*Primary Examiner*—Thomas D. Lee
*Assistant Examiner*—Stephen Brinich
*Attorney, Agent, or Firm*—Morgan & Finnegan, L.L.P.

[57] ABSTRACT

A facsimile apparatus receives and stores image data, receives a sub-address signal, and processes the stored image data using pre-stored processing corresponding to the received sub-address signal.

14 Claims, 32 Drawing Sheets

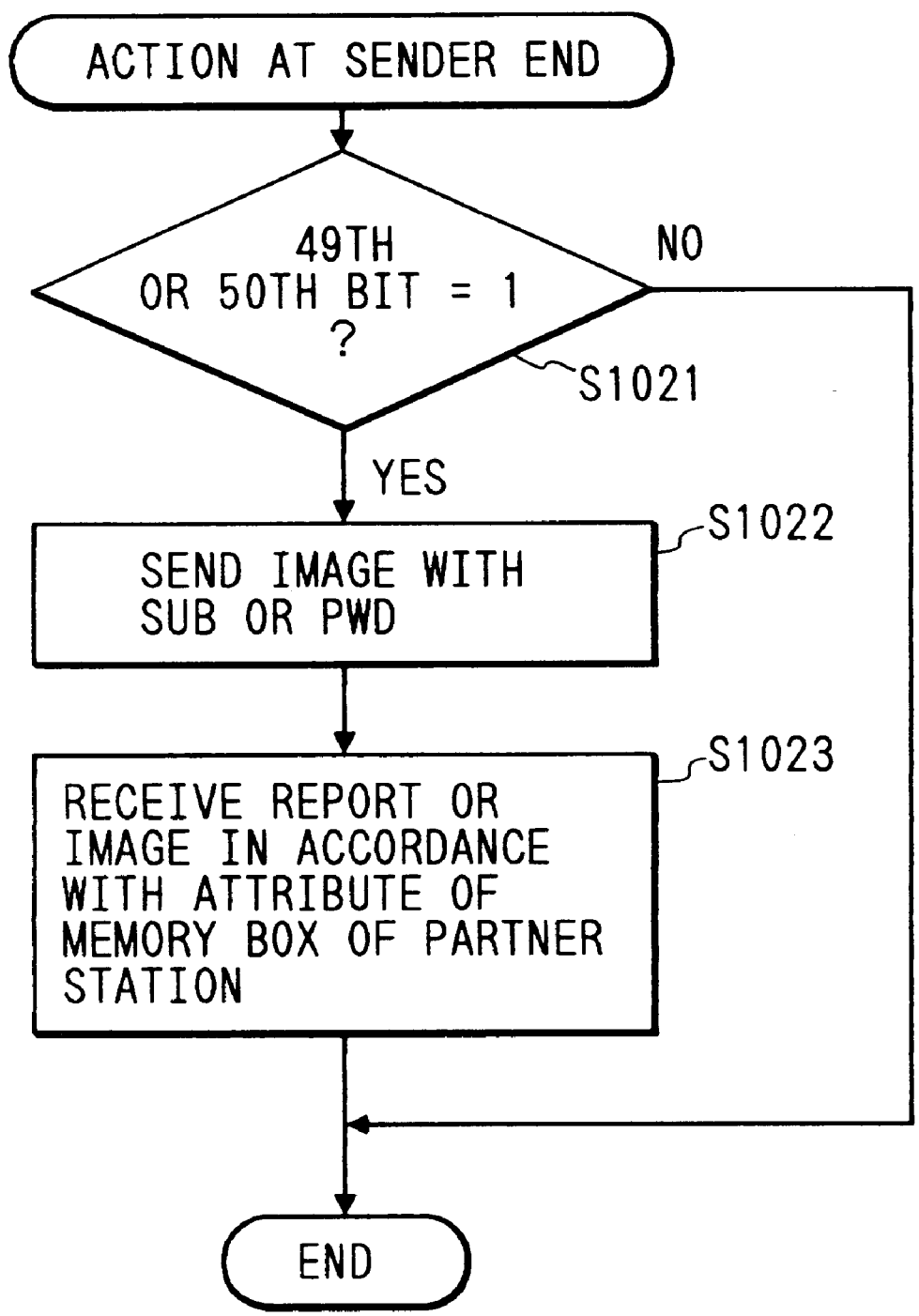

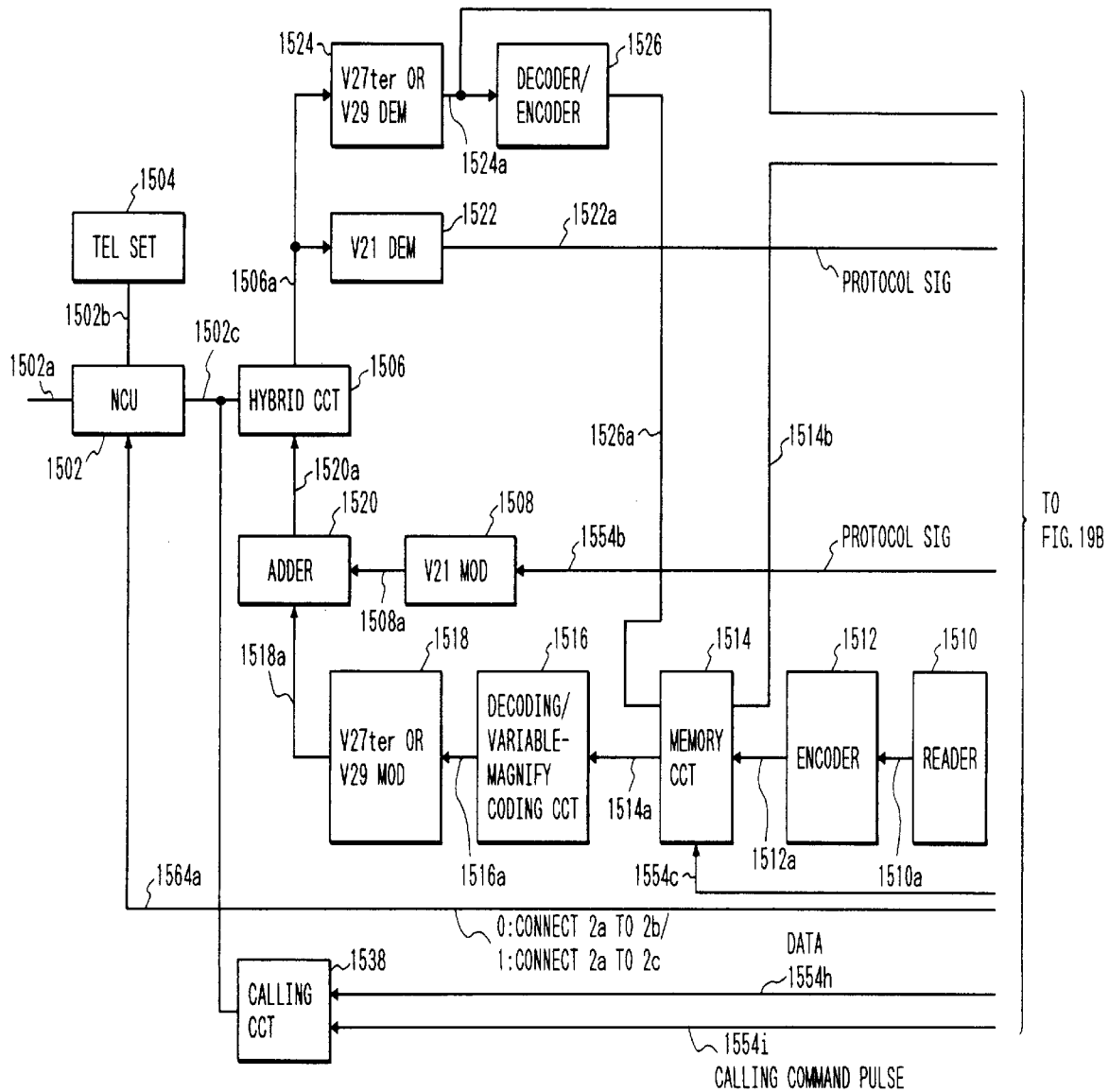

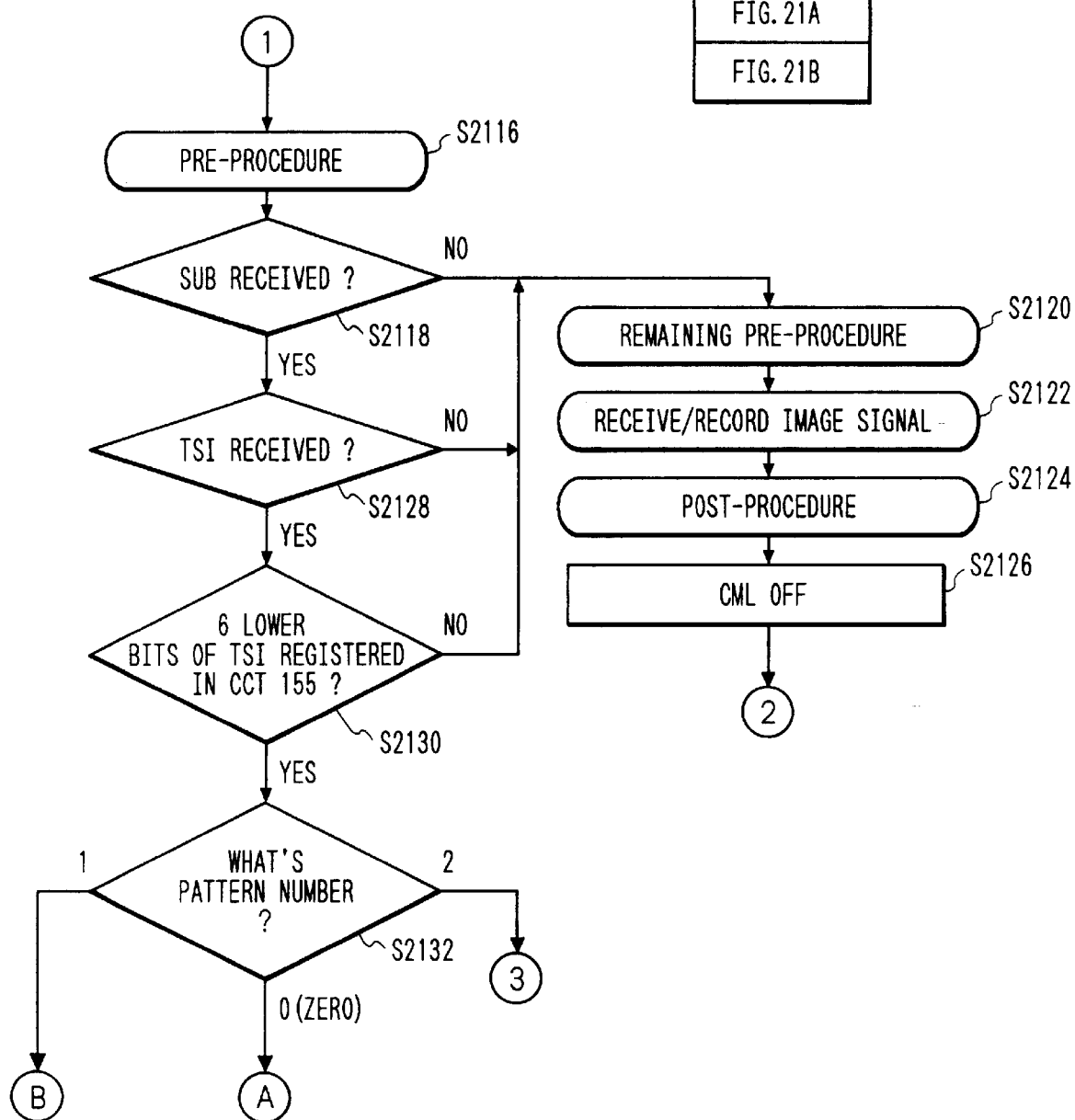
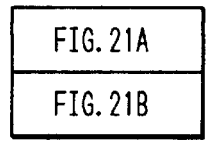

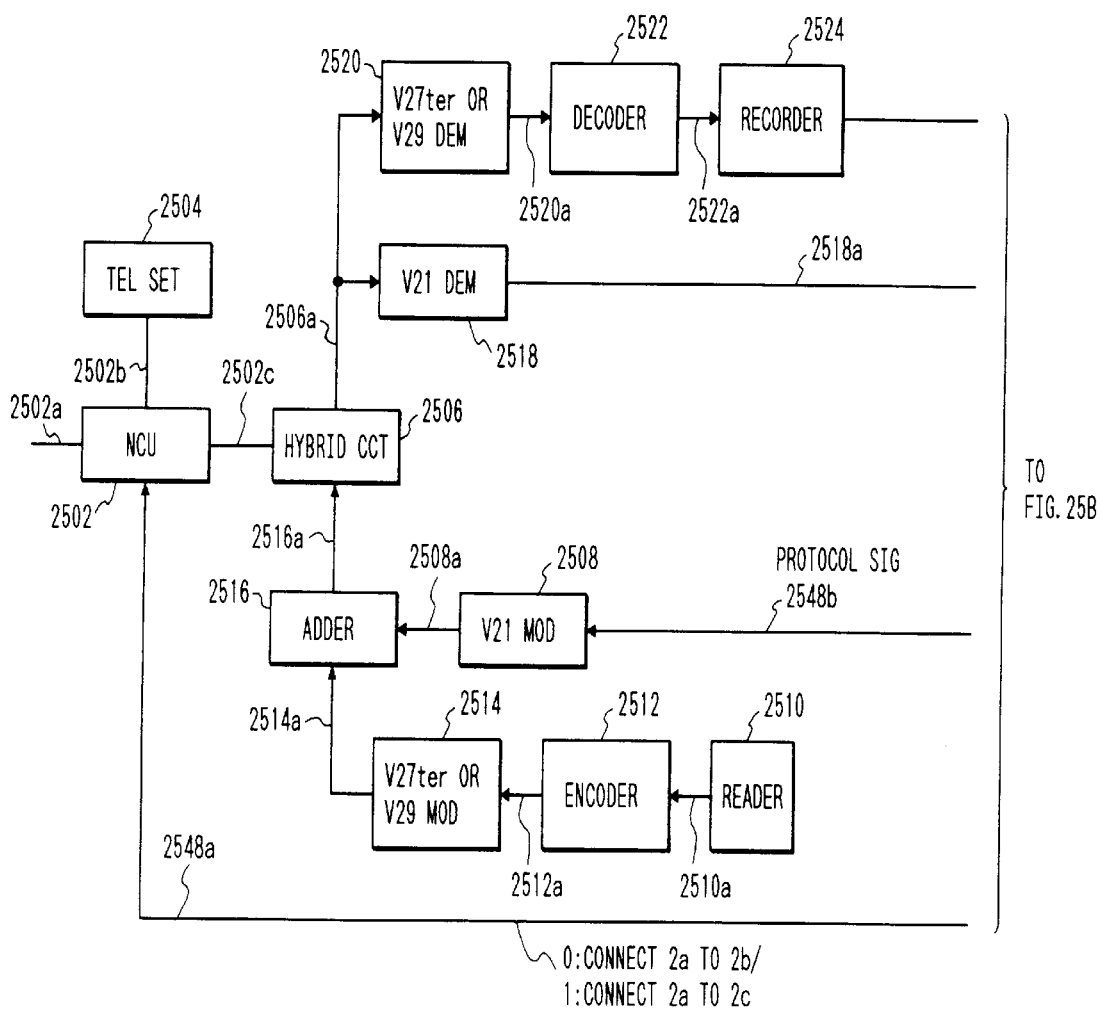

FACSIMILE APPARATUS FOR PROCESSING RECEIVED IMAGE DATA ACCORDING TO SUB-ADDRESS SIGNAL

This is a continuation of application Ser. No. 08/348,059, filed on Dec. 1, 1994.

BACKGROUND OF THE INVENTION

1. Field of the Invention

The present invent on relates to a facsimile apparatus and a communication control method having a sub-address function.

Also, the invention relates to a facsimile apparatus and a facsimile communication method having a sub-address function or a password function which is an additional function in CCITT (International Telegraph and Telephone Consultative Committee) recommendation/T.30.

2. Related Background Art

In CCITT SG8 meeting held in April, 1993, it has been determined that the sub-address, the password, and the selective polling function is additionally recommended. Herein, the recommendation regarding the sub-address involves notifying the presence or absence of a sub-address receiving function to the transmitter in terms of bit 49 of a DIS/DTC signal, and sending 20-digit information with a SUB signal when the sender designates the sub-address.

Since the presence or absence of the receiving function of a sub-address signal can be designated in terms of the DIS signal, the SUB signal (sub-address signal) can be transmitted or received between other manufacturer's stations. Accordingly, the communication between the self station and other manufacturer's station had a significant drawback that if the operation based on the SUB signal in the receiver end is different from the operation based on the SUB signal in the sender end, the communication based on the sub-address information can not be correctly executed, causing a malfunction.

Also, the communication between the same manufacturer's stations had a further drawback that different settings of using the SUB signal between the sender end and the receiver end would result in a malfunction.

SUMMARY OF THE INVENTION

It is an object of the present invention to define a method of using the sub-address signal in the facsimile apparatus.

It is another object of the invention to provide a facsimile apparatus which can make the communication by the method of using the sub-address signal to be consistent between the sender end and the receiver end.

BRIEF DESCRIPTION OF THE DRAWINGS

FIG. 18 is a flowchart showing the operation on the image sender end.

DETAILED DESCRIPTION OF THE PREFERRED EMBODIMENTS

EXAMPLE 1

A facsimile apparatus and a communication control method thereof according to one embodiment of the present invention will be described with reference to the drawings.

Figure 1:
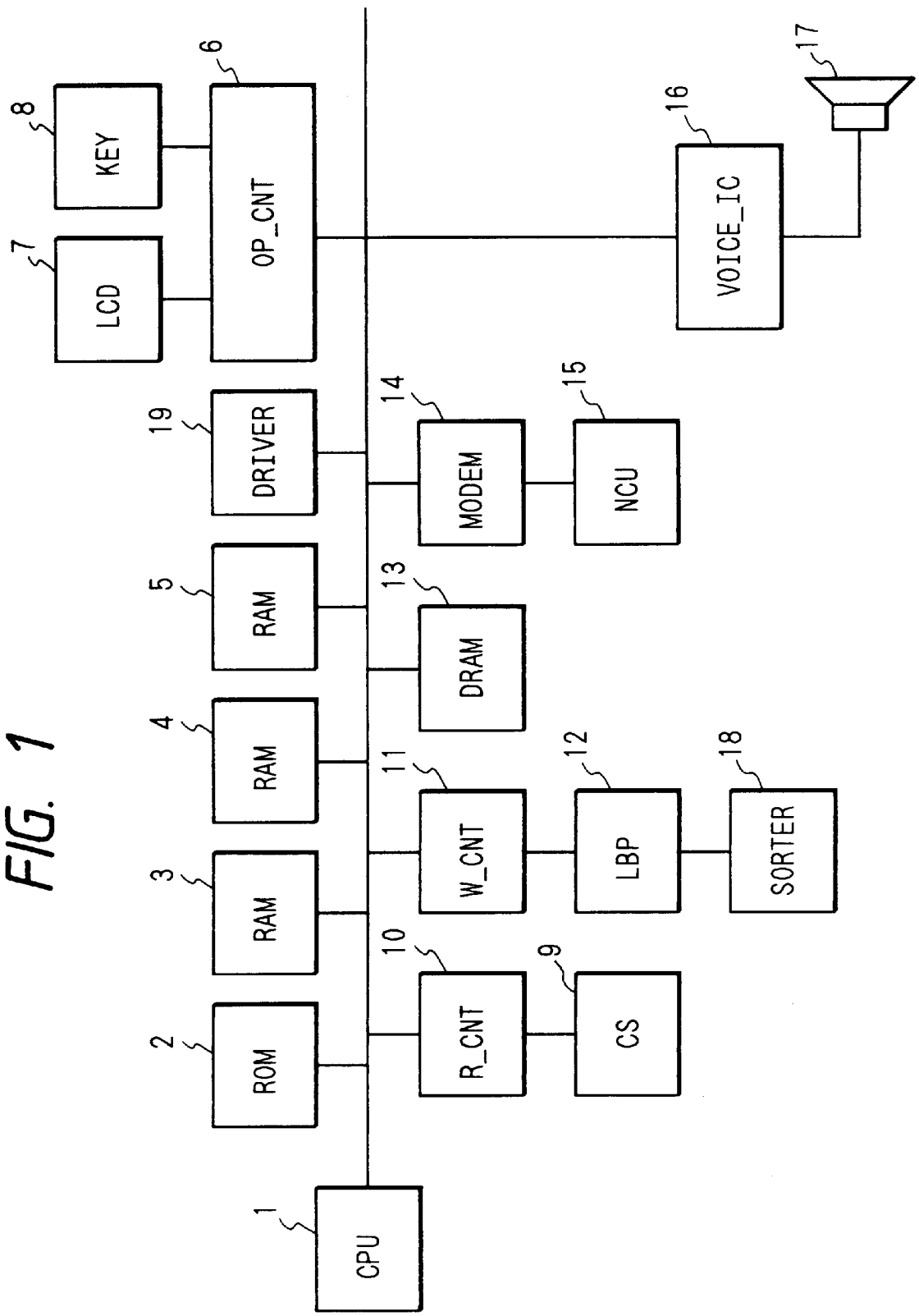
FIG. 1 is a block diagram showing the electrical configuration of a facsimile apparatus.

FIG. 1 is a block diagram showing the electrical configuration of the facsimile apparatus. A CPU 1 is a central processing control unit for controlling the whole of the apparatus in accordance with the contents of programs stored in a ROM 2. A RAM 3 is used as the work area of the CPU 1 as required.

A contact sensor (CS) 9 serves to read the original, read original being compressed and encoded through a read control gate array (R_CNT) 10, and stored in an image memory (DRAM) 13, with the image management information such as a reception number, destination information, the number of pages, stored image memory block information, and an operation command being stored in a RAM 4. The image data stored in the image memory 13 is expanded and decoded by a record gate array (W_CNT) 11, and printed on the recording sheet by a laser beam printer (LBP) 12, the recording sheets as printed being sorted by a sorter (SORTER) 18. Also, the image data stored in the image memory 13 is PM-AM demodulated by a modulator-demodulator (MODEM) 14, and then sent to the line through an NCU (Network Control Unit) 15 or sent to an external computer (not shown) through a driver (DRIVER) 19.

Also, if the received image is input into the modem 14 through the NCU 15, it is demodulated by the modem 14, expanded and decoded, and checked for image error. As a result of checking, if it is correct without any image error, the received image is compressed and encoded, and stored in the image memory (DRAM) 13, and the image management information is stored in the RAM 4.

The operator can make a variety of designations or settings by depressing a key (KEY) 8, its content being stored and displayed on a display unit (LCD) 7 according to the following procedure. That is, the CPU 1 detects input data upon depressing the key 8 via a panel control gate array (OP_CNT) 6 and displays necessary data on the LCD 7. The CPU 1 sends an output signal to a voice IC (VOICE_IC) 16, in accordance with the information stored in the RAMs 3 to 5, and outputs the voice from a speaker 17.

Figure 2:
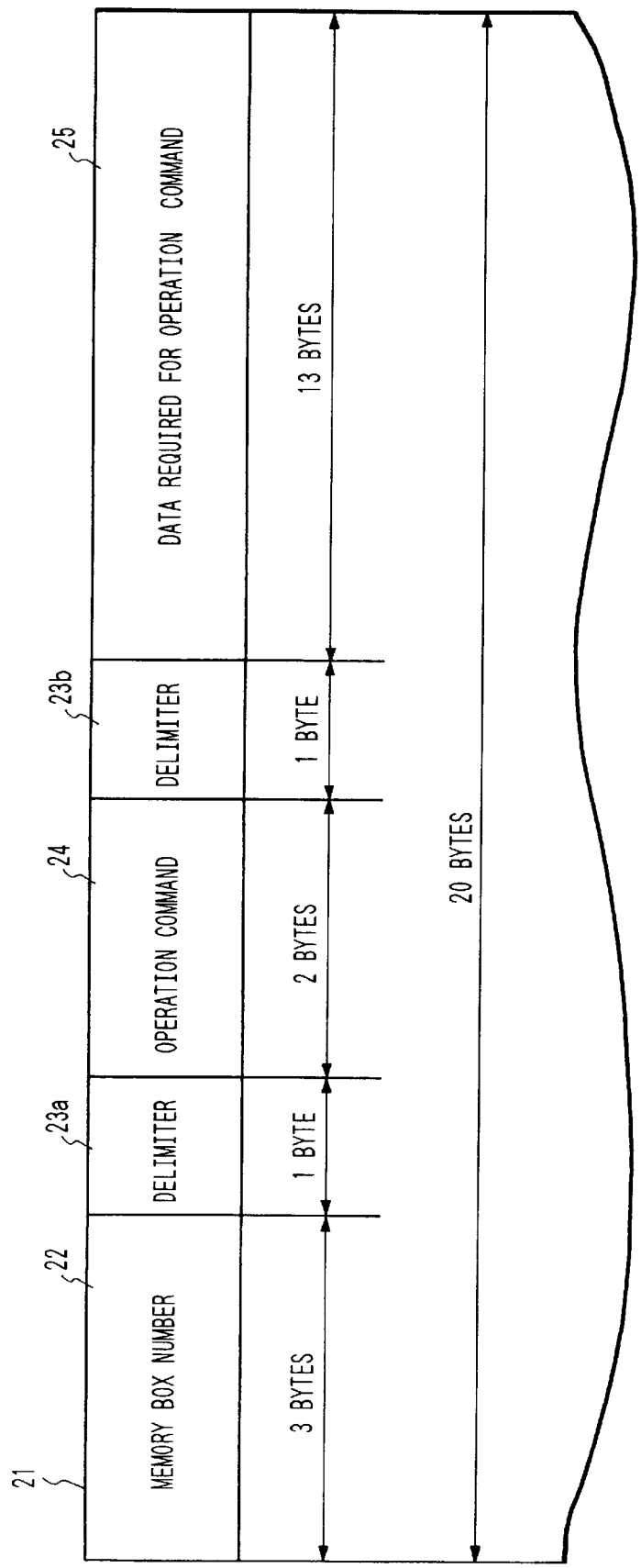
FIG. 2 is an explanatory chart showing the format of a sub-address for use in the facsimile apparatus of the invention.
Figure 3:
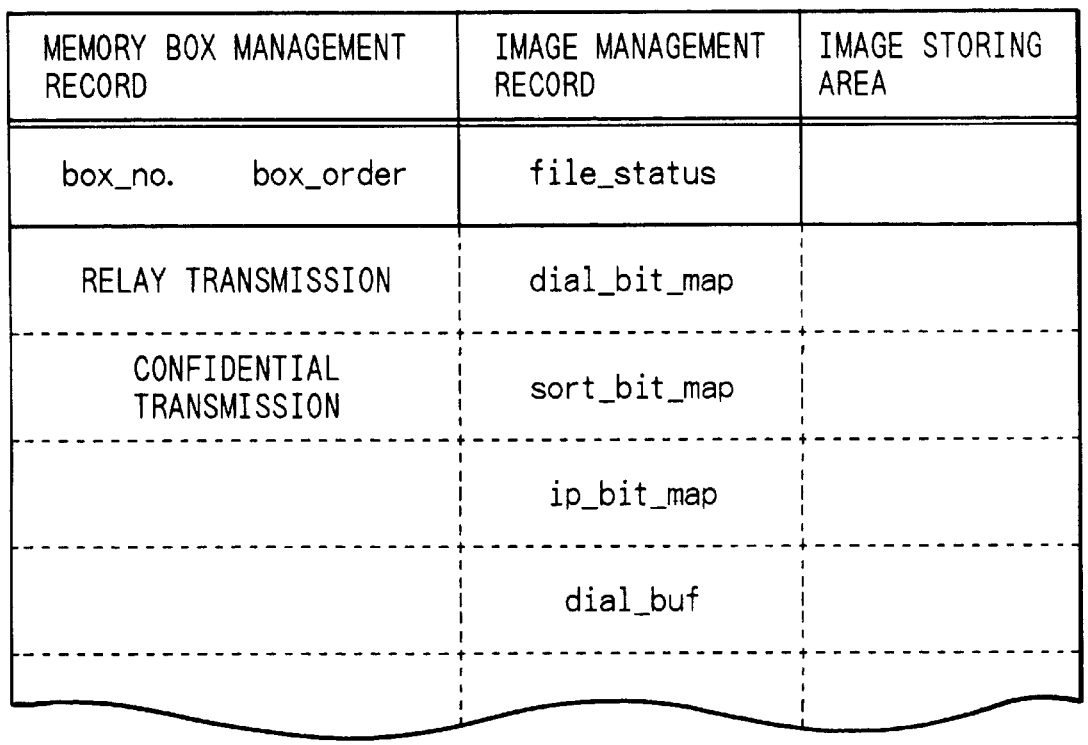
FIG. 3 is an explanatory chart showing the contents of a memory box.

FIG. 2 is an explanatory chart showing the format of a sub-address for use in the facsimile apparatus of this embodiment. The sub-address 21 consists of a 20-digit number (20 bytes), the first three bytes storing a memory box number 22 which is a memory box ID (identification number) as the three-digit number. FIG. 3 is an explanatory view showing the contents of a memory box. The memory box is allocated to the RAM 4 and the DRAM 13, consisting of an image management record (area for storing image information), an image storing area, and a memory box management record (area for storing management information of the memory area subdivided into some blocks). The components within the memory box will be apparent from the description as follows.

Next to the memory box number 22, a delimiter 23a of one byte is arranged which is a separator for clarifying the internal configuration of the sub-address 21.

The next two bytes store an operation command represented by a two-digit number (100 numbers from 00 to 99). The further next one byte stores a delimiter 23b.

In the 8-th byte and beyond, data 25 required for executing the operation command 24 is stored.

While in this example, the sub-address was defined by using the delimiter, it should be noted that the delimiter is not necessarily defined if the format of sub-address is predefined. Also, regarding the size and storage location of the memory box number 22, the operation command 24 and the data 25, the format is not limited to this example, but may be defined arbitrarily.

Figure 4:
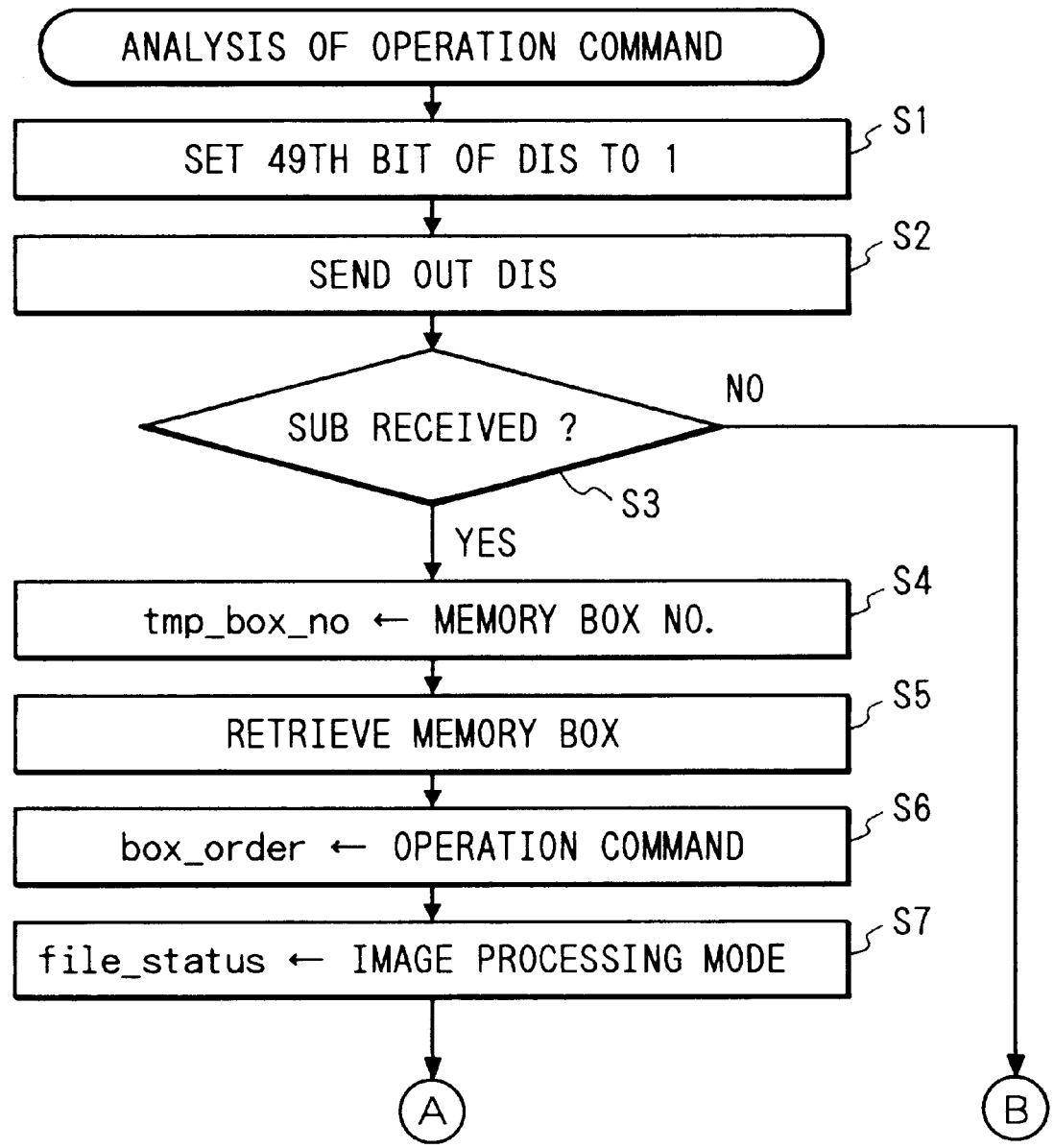
FIG. 4 is a flowchart showing a control routine for analyzing an operation command within a received sub-address (SUB).
Figure 5:
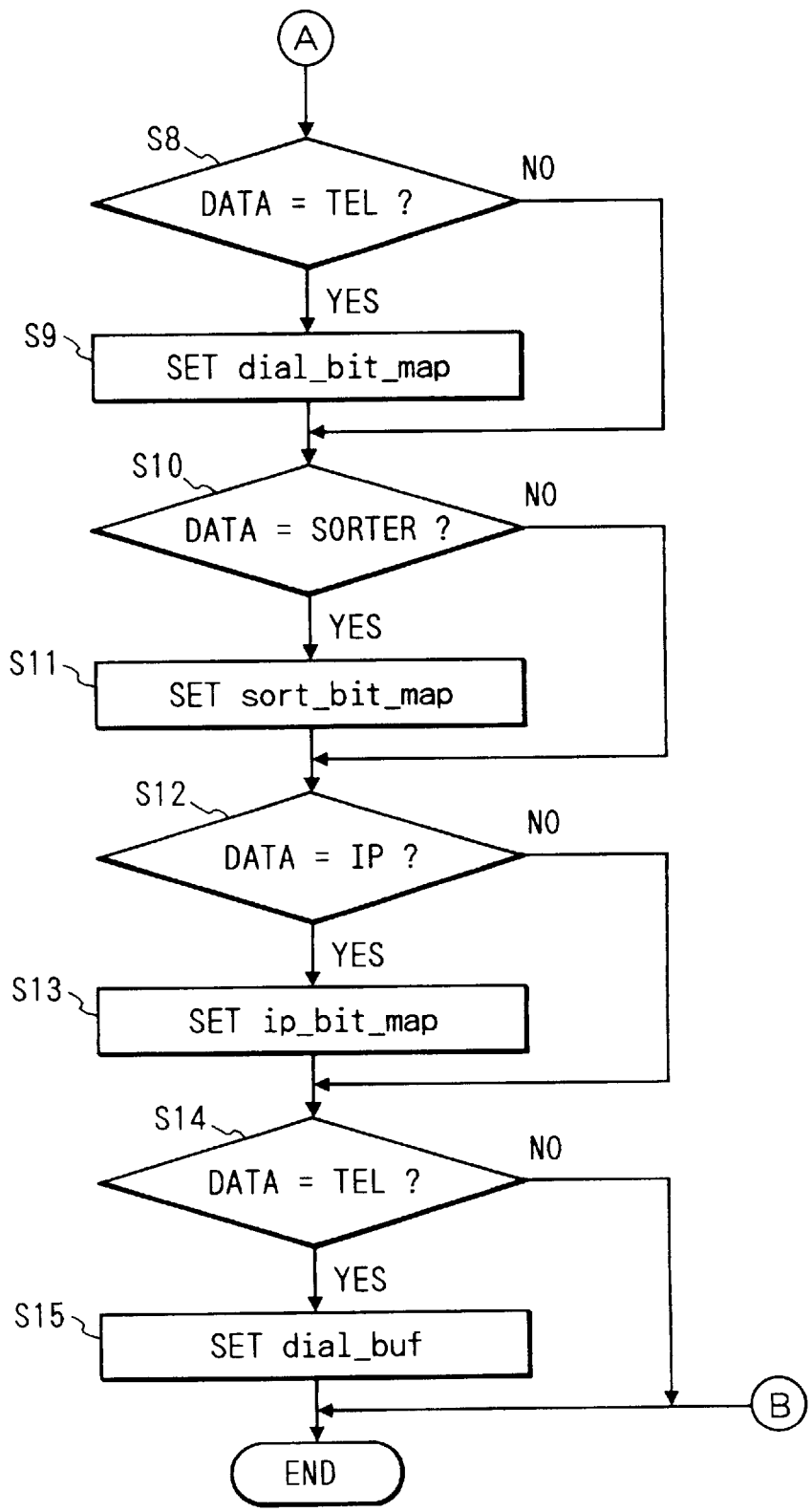
FIG. 5 is a flowchart showing the control routine for analyzing the operation command within the received sub-address (SUB), continued from FIG. 4.

FIGS. 4 and 5 are flowcharts showing a control routine for analyzing the operation command within the sub-address (SUB) received. This routine is started upon the facsimile apparatus on the called side receiving the image and declaring the presence of sub-address function to the facsimile apparatus on the calling side, using the DIS signal (digital identification signal).

First, in order to declare the presence of sub-address function to the facsimile apparatus on the calling side, the 49-th bit of DIS (digital identification signal) is set to "1" (step S1), and the DIS (digital identification signal) is sent to the facsimile apparatus on the calling side (step S2).

Subsequently, the operation waits for a SUB (sub-address) and a DCS (digital instruction signal) which the facsimile apparatus on the calling side sends out to be received (step S3), and if the SUB (sub-address) is not received, this routine is ended and transfers to a normal communication control procedure that follows, upon receiving the DCS (digital instruction signal).

If the SUB (sub-address) which the facsimile apparatus on the calling side sends out is received at step S3, the facsimile apparatus on the called side picks up the memory box number from the SUB (sub-address) and converts it to the int type, which is stored in a temporarily set memory box management record.

In this way, the facsimile apparatus on the called side has memory boxes and elements box_no, box_order, dial_bit_map corresponding to the total memory box number, each element being distinctly discriminated for every memory box.

Figure 6:
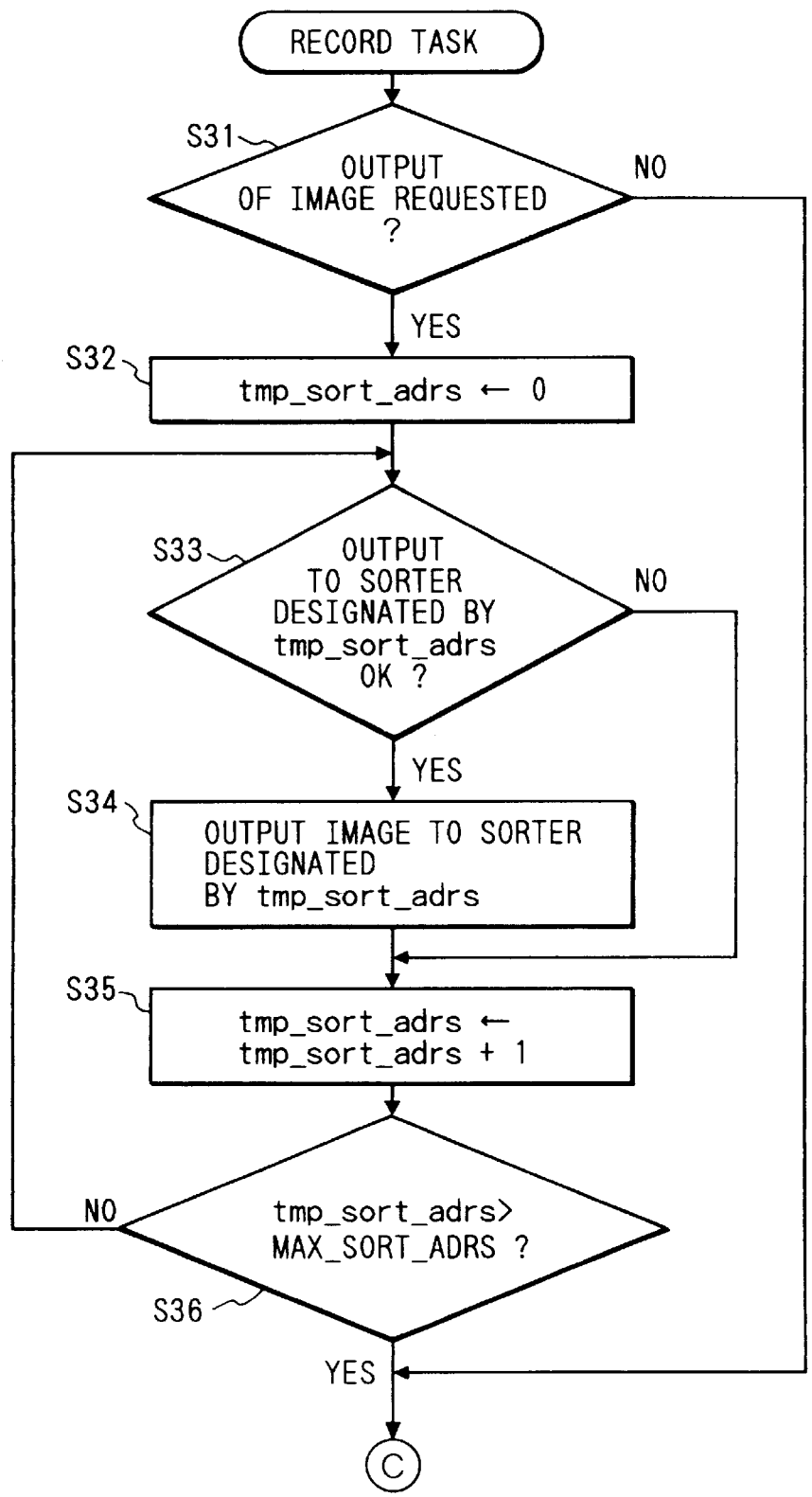
FIG. 6 is a flowchart showing a record task routine which is activated periodically by a facsimile apparatus on the called side.
Figure 7:
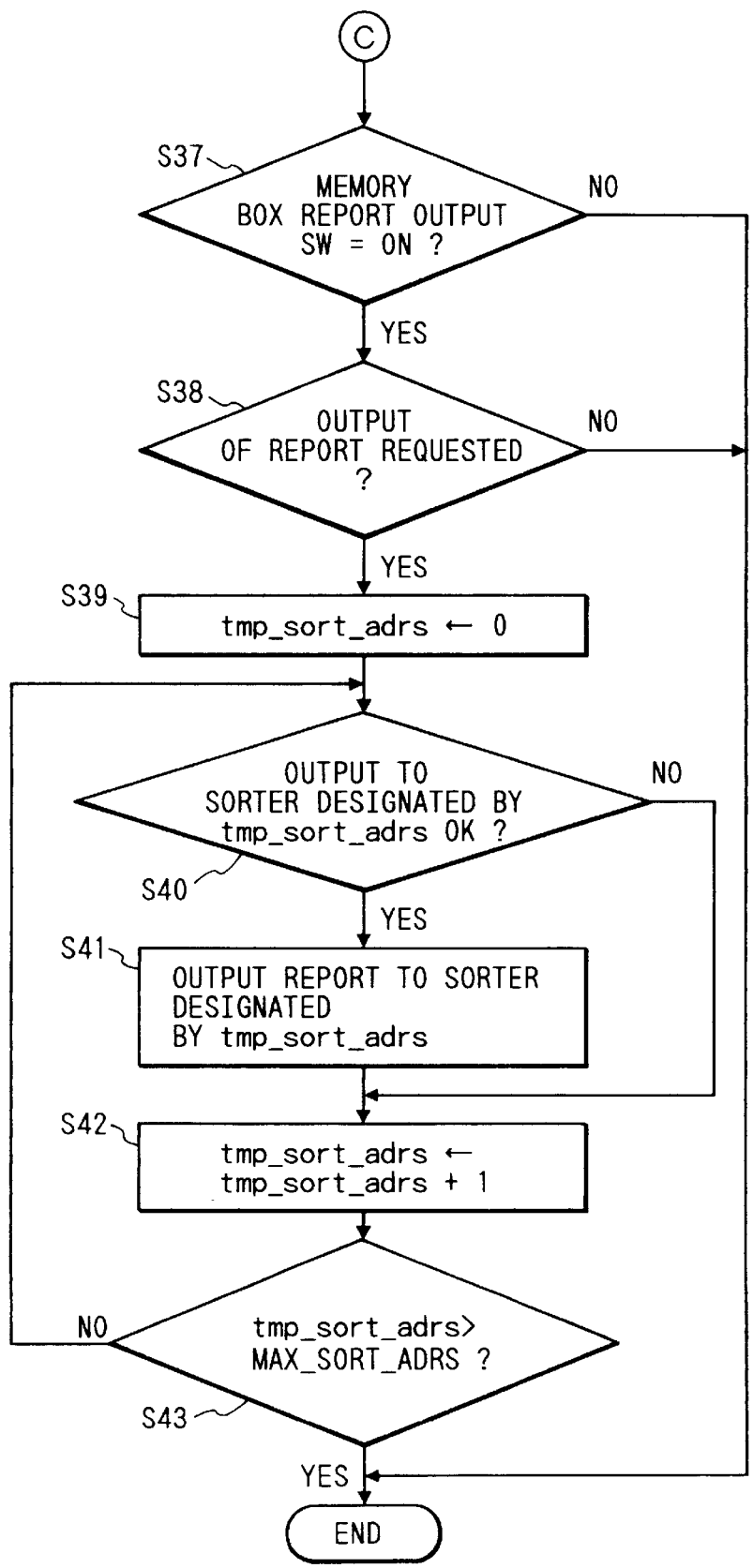
FIG. 7 is a flowchart showing the record task routine which is activated periodically by the facsimile apparatus on the called side, continued from FIG. 6.

FIGS. 6 and 7 are flowcharts showing a record task routine which is activated periodically by the facsimile apparatus on the called side. First, the facsimile apparatus on the called side checks for a status file_status within the image management record stored as the image processing mode in accordance with the operation command number of sub-address, to determine whether or not the output of image is required (step S31). If the output of image is not required, the operation transfers to step S36. If the output of image is required, a temporarily set sorter address tmp_sort_adrs is initialized to the value "0" (step S32).

A check is performed to determine whether or not the image can be output to a sorter designated by the sorter address tmp_sort_adrs (step S33). When the image can be output to the sorter designated by tmp_sort_adrs, the operation transfers to the next step S35 unless the bit corresponding to the sorter address tmp_sort_adrs is high in a map sort_bit_map where the sorter address within the image management record is stored, in order to determine whether or not the image is requested to output to that sorter. If that bit is high (that is, "1"), the image is output to the sorter at step S34. Note that the image is output at the address having the sort_bit_map of 1, and not output at the address having the sort_bit map of 0.

At step S35, the sorter address tmp_sort_adrs is incremented. A check is performed to see whether or not the sorter address tmp_sort_adrs exceeds the maximum value MAX_SORT_ADRS of sorter address (step S36), and if not, the operation returns to step S33. If the sorter address tmp_sort_adrs exceeds the maximum value MAX_SORT_ADRS of the sorter address, the operation goes to step S37, since the image has been output to all the sorters to which the output of image is requested at steps S32 to S36.

Subsequently, a check is performed to see whether or not the output SW of the memory box report is on (step S37), and if the output SW is off, the operation is ended.

If the output SW is on, a check is performed to see whether or not the output of report is requested (step S38), by reading the status file_status within the image management record, and if not requested, this routine is ended. If the output of report is requested, the temporarily set sorter address tmp_sort_adrs is initialized to the value "0" (step S39). If there is any further sorter requested for the output of report, a check is performed to see whether or not the bit corresponding to the sorter address tmp_sort_adrs is high in the map sort_bit_map where the sorter address is stored (step S40), and if that bit is high, the report is output to the sorter designated by the sorter address tmp_sort_adrs (step S41), and the sorter address tmp_sort_adrs is incremented (step S42). If the bit is not high at step S40, the operation transfers directly to step S42. Then, a check is performed to see whether or not the sorter address tmp_sort_adrs exceeds the maximum value MAX_SORT_ADRS of sorter address (step S43), and if not, the operation returns to step S40. If it exceeds, this routine is ended, since the report has been output to all the sorters to which the output of report is requested. In this way, the report can be output to all the sorters to which the output of report is requested by executing the processings at steps S37 to S43.

Figure 8:
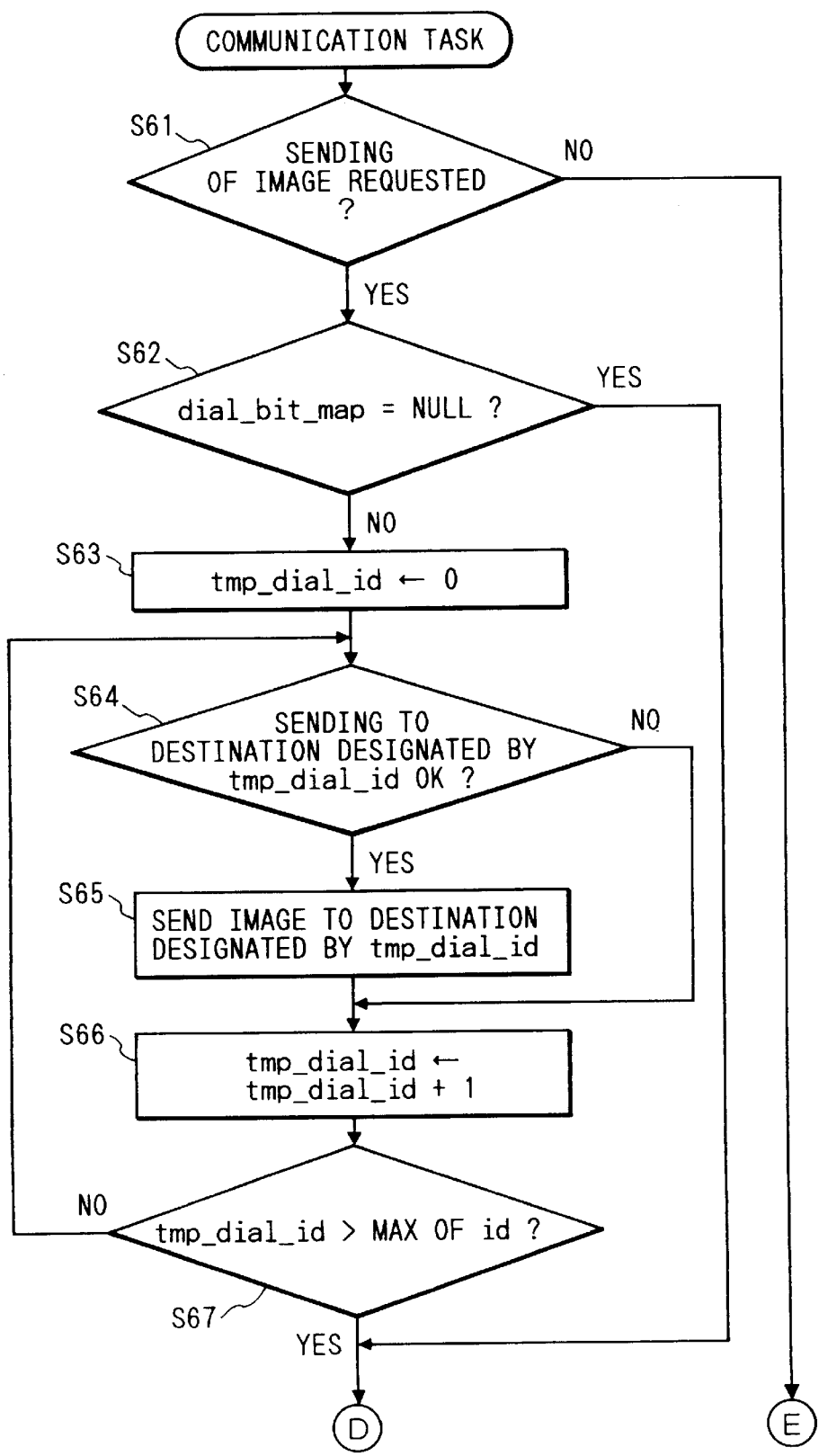
FIG. 8 is a flowchart showing a communication task routine which is activated periodically by a facsimile apparatus on the called side.
Figure 9:
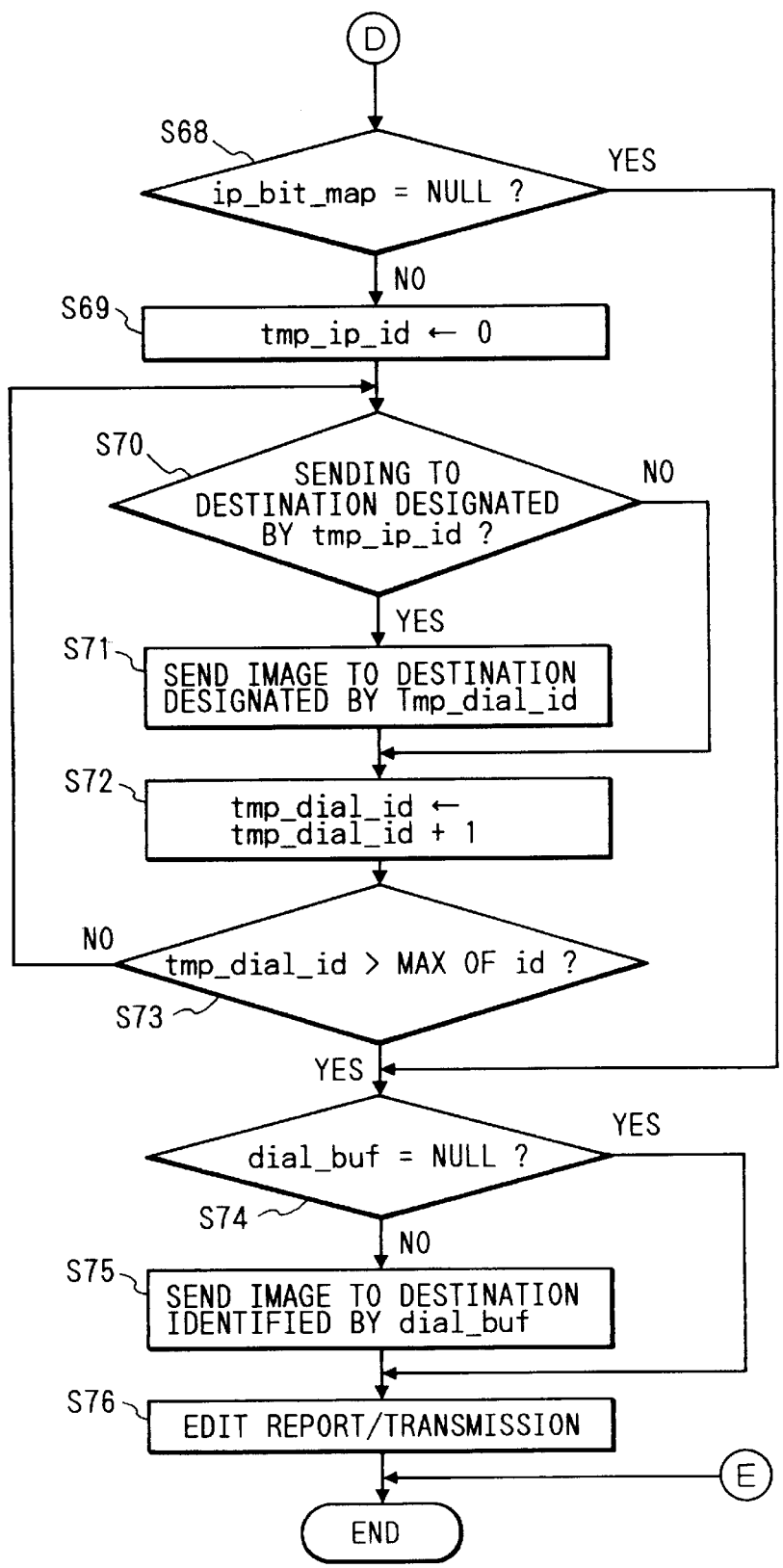
FIG. 9 is a flowchart showing the communication task routine which is activated periodically by the facsimile apparatus on the called side, continued from FIG. 8.

FIGS. 8 and 9 are flowcharts showing a communication task routine which is activated periodically by the facsimile apparatus on the called side. This routine processes a stored image. First, a check is performed to see whether or not the sending of image is requested by reading the status file_status within the image management record stored as the image processing mode corresponding to the operation command number of sub-address (step S61). If the sending of image is not requested, this routine is ended, or if the sending of image is requested, a check is performed to see whether or not a dial map dial_bit_map where the telephone number within the memory box is stored is NULL (step S62). If the dial map dial_bit_map is NULL, the operation transfers to step S68. If not, a temporarily set dial address tmp_dial_id is initialized to the value "0" (step S63).

Next, to obtain the sending destination, a check is performed to see whether or not the bit corresponding to the dial address tmp_dial_id is high in the dial map dial_bit_map (step S64), and if that bit is high, the image is sent to a destination designated by the dial address tmp_dial_id (step S65), and the dial address tmp_dial_id is incremented (step S66). If the bit is not high in the dial map dial_bit_map at step S64, the operation transfers directly to step S66. Note that the actual telephone number corresponding to each address of dial_bit_map is stored in the RAM 5.

Then, the dial address tmp_dial_id is checked to see whether it exceeds the maximum value of destination id (identification number) (step S67). If not, the operation returns to step S64, or if the dial address tmp_dial_id exceeds the maximum value, the operation transfers to step S68. In this way, by executing steps S62 to S67, the image is sent to all the destinations for which the sending of image is requested.

Subsequently, at step S68, a check is carried out to determine whether or not an IP address map ip_bit_map within the memory box is NULL, and if NULL, the operation transfers to step S74. If the IP address map ip_bit map is not NULL, a temporarily set IP address ip_bit_id is initialized to the value "0" (step S69).

Next, to obtain the sending destination, a check is performed to determine whether or not the bit in the IP address map ip_bit_map corresponding to the IP address ip_bit_id is high (step S70). If the bit in the IP address map ip_bit_map is high, the image is sent to the destination designated by the IP address ip_bit_id (step S71), and the IP address ip_bit_id is incremented (step S72). At step S70, if the bit in the IP address map ip_bit_map is not high, the operation transfers directly to step S72.

Subsequently, the IP address ip_bit_id is checked to determine whether or not it exceeds the maximum value of the IP address map ip_bit_map (step S73), and if not, the operation returns to step S70. If the IP address ip_bit_id exceeds the maximum value of the IP address map ip_bit_map, the operation transfers to step S74.

At step S74, a check is performed to determine whether or not a dial buffer dial_buf within the memory box is NULL (step S74), and if not NULL, the image is sent to the destination of the dial buffer dial_buf (step S75), and a communication result report is created and sent in accordance with a status file_status within the image management record (step S76), after which this routine is ended. If the dial buffer dial_buf is NULL at step S74, the operation transfers to step S76. In this way, by performing the processings at steps S61 to S76 for all the image management records, the sending of all the images requested is ended.

As described above, with the facsimile apparatus and its communication control method of the present invention, the recording and sending of the image received using the sub-address can be performed.

Next, a facsimile apparatus on the calling side and its communication control method will be described below.

Figure 10:
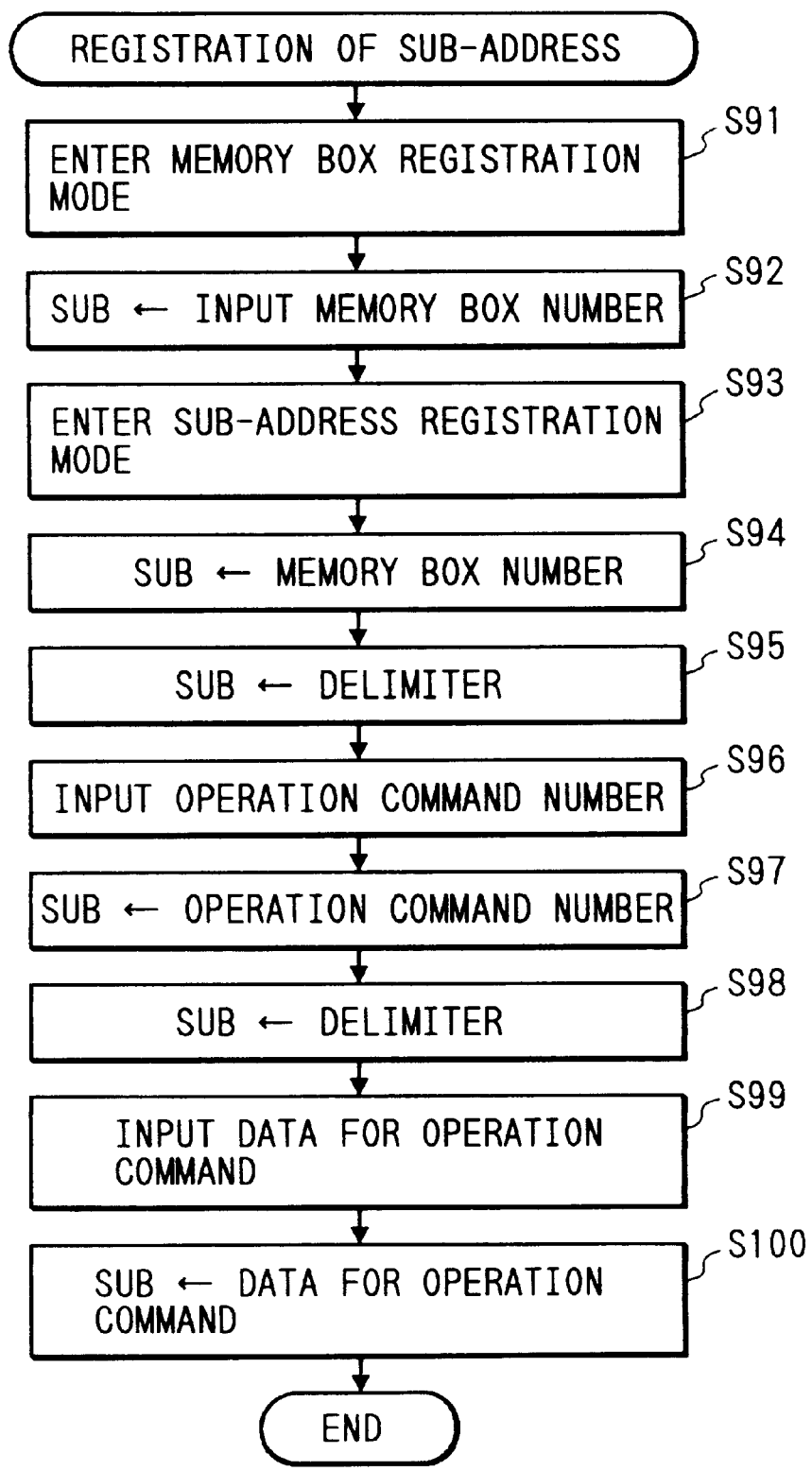
FIG. 10 is a flowchart showing a sub-address registration routine which is executed by a facsimile apparatus on the calling side.

FIG. 10 is a flowchart showing a sub-address registration routine which is executed by the facsimile apparatus on the calling side.

In the facsimile apparatus on the calling side, a memory box registration mode is entered (step S91), and a memory box number desired to register is input (step S92).

Subsequently, the operation transfers to a sub-address registration mode (step S93). And the memory box number input at step S92 is written into the first three bytes of the sub-address (step S94), and a delimiter is written into the 4-th byte of the sub-address (step S95), before registering an operation command in the sub-address. Also, the operation command desired to designate with the sub-address is input by a key 8 in the format of operation command number (step S96), and the input operation command number is registered in two bytes from the 5-th byte of the sub-address (step S97). After the operation instruction number is registered in the sub-address, the delimiter is written into the 7-th byte of the sub-address (step S98). Further, as necessary data for the operation command, data such as a telephone number, a one-touch telephone number, an abbreviated telephone number, an extension, and a sorter address are input by the key 8 such as a ten key, a one-touch key, an abbreviation key, a cursor key, a set key or a function key (step S99), and the data is written into the 8-th byte and downwards of the sub-address (step S100). Then, a series of routines for registering the operation command in the sub-address is ended.

Figure 11:
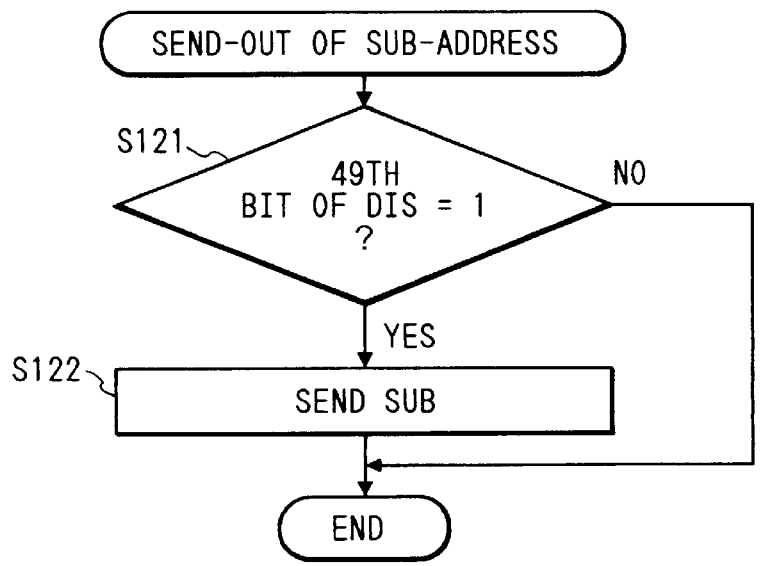
FIG. 11 is a flowchart showing a sub-address send-out routine which is executed by the facsimile apparatus on the calling side.

FIG. 11 is a flowchart showing a sub-address send-out routine which is executed by the facsimile apparatus on the calling side. The facsimile apparatus on the calling side first checks to determine whether or not the 49-th bit of DIS (digital identification number) received from the facsimile apparatus on the called side is "1" (step S121). If the 49-th bit is not "1", this routine is immediately ended.

On the other hand, if the 49-th bit is "1" at step S121, the memory box number is stored in a variable tmp_box_no of sub-address number (step S4). The operation retrieves for a memory box having, as a component, a memory box number box_no coincident with the memory box number stored in the variable tmp_box_no which the facsimile apparatus on the called side possesses (step S5).

Subsequently, the operation command number is picked up from the SUB (sub-address), and stored in a variable box_order showing the operation command number which is a component of the memory box (step S6). Further, the image processing mode is stored in the status file_status within the image management record to correspond to the operation command number stored in the variable box_order (step S7).

The format of necessary data may differ depending on the operation command number stored in the variable box_order. First, a check is performed to determine whether or not the operation command data is a telephone number such as a one-touch or abbreviated number (step S8). If so, the data is stored in the dial map dial_bit_map in the form of map (step S9). If not, a check is performed to see whether or not the operation command data is a sorter address (step S10). If the operation command data is the sorter address, the sorter address is stored in a sorter address map sort_bit_map in the form of map (step S11). If the operation command data is not the sorter address, a check is performed to see whether or not the operation command data is an IP address (step S12). If so, the operation command data is stored in an IP address map ip_bit_map in the form of bit map (step S13). If not, the operation command data is checked to determine whether or not it is a telephone number (step S14). If the operation command data is not the telephone number, its telephone number is stored in the dial buffer dial_buf (step S15). If the operation command data is not the telephone number, this routine is ended.

Thereafter, in accordance with a normal communication control procedure, the image communication is made. The sent image and information regarding the image is stored in an image storing area for each memory box number, the sub-address (SUB) registered by an sub-address registration routine and a digital instruction signal (DCS) are sent out (step S122), and this routine is ended.

As described above, with the facsimile apparatus and its communication control method of the invention, in addition to the equivalent effects as previously described in the example 1, the more universal communications can be achieved because the facsimile apparatus on the calling side registers the sub-address by using the key, and sends out it, only if the facsimile apparatus on the called side admits the sub-address to be effective.

Figure 12:
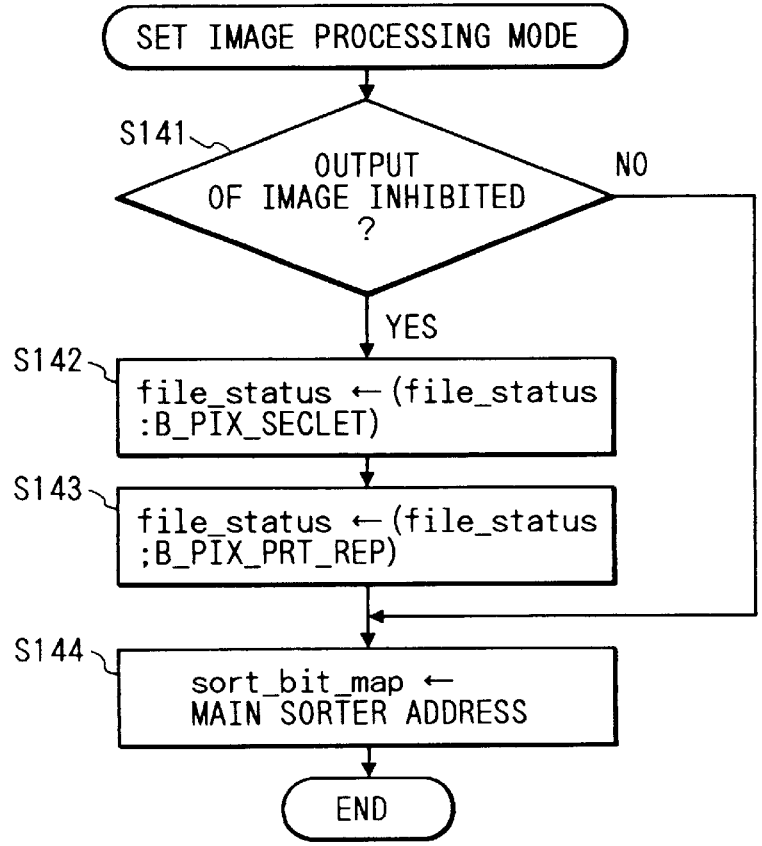
FIG. 12 is a flowchart showing an image processing setting routine as the analysis of an operation command.

Next, there will be described a procedure for the facsimile apparatus on the called side to analyze an operation command when the operation command within the sub-address received is an "image output inhibit". FIG. 12 shows a process of reflecting the image processing mode at step S7 in FIG. 4 onto the status file_status of the image management record.

The facsimile apparatus on the called side first determines whether or not the operation command box_order picked up at step S6 in FIG. 4 is "image output inhibit" (step S141), and if the operation command is not "image output inhibit", the operation transfers to step S144, or otherwise, the operation transfers to step S142. At step S142, a bit B_PIX_SECLET signifying the image recording inhibit is set up in the status file_status for each image management record. Subsequently, an output request bit B_PIX_PRT_REP of the memory box report is set up in the status file_status (step S143). At step S144, the main sorter address is set in the map sort_bit_map where the sorter address within the image management record is stored (step S144), whereby the setting of the image processing mode is ended.

As described above, with the facsimile apparatus and its communication control method of this example, it is possible to achieve a higher universality because the facsimile apparatus on the calling side can transmit by setting "image output inhibit" of the facsimile apparatus on the called side in the sub-address.

Next, an operation command analysis wherein the operation command within the sub-address received is a relay transmission or relay broadcast communication of transmitting the image to the designated apparatus or apparatuses will be described below.

Figure 13:
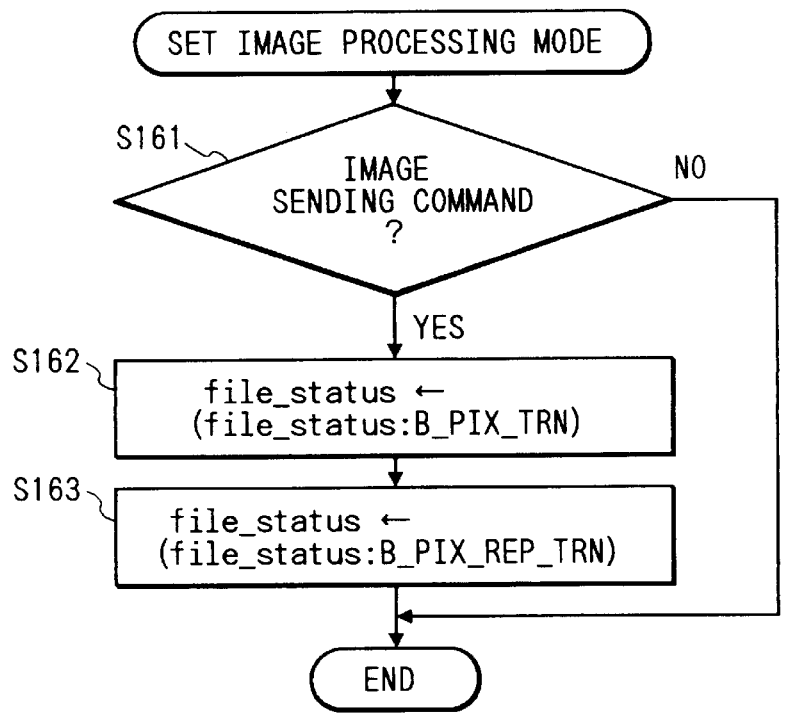
FIG. 13 is a flowchart showing an image processing mode setting routine.

FIG. 13 is a flowchart showing an image processing mode setting routine. This routine shows a process of reflecting the image processing mode at step S7 in FIG. 4 to the status file_status of the image management record. The facsimile apparatus on the called side first determines whether or not the operation command number box_order picked up at step S6 in FIG. 4 is a relay transmission or relay broadcast communication of transmitting the image to the designated apparatus or apparatuses (step S161). If it is not the relay transmission or relay broadcast communication, this routine is ended, but if it is, a bit B_PIX_TRN signifying the transmission of the image is set up in the status file_status of the image management record (step S162). A transmission request bit B_PIX_REP_TRN of the communication result report signifying the image transmission result is set up in the status file_status of the image management record (step S163), and the setting of the image processing mode for this routine is ended.

And a sending operation for the relay transmission or relay broadcast communication is performed in accordance with the communication task routine of FIGS. 8 and 9 which is periodically activated, as previously described.

Since the B_PIX_REP_TRN is set in the status file_status within the image management record, the communication result report is created and sent out to the image sender (step S76), and this routine is ended.

As described above, with the facsimile apparatus and its communication control method of this example, the relay transmission or relay broadcast communication can be simply achieved using the sub-address.

Next, an operation command analysis wherein the operation command within the sub-address received is to output the image to the designated sorter will be described below.

Figure 14:
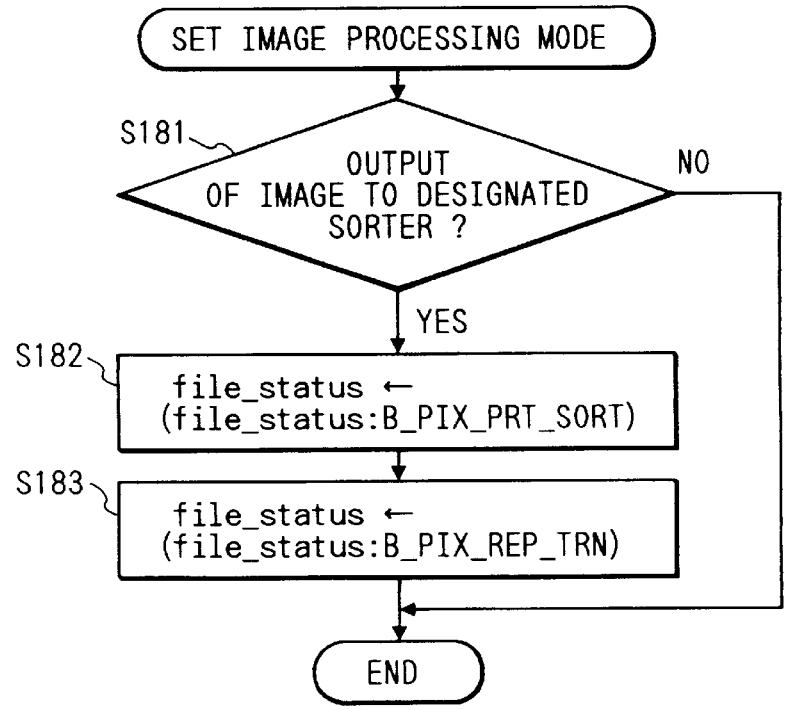
FIG. 14 is a flowchart showing an image processing mode setting routine.

A recording sheet from a laser printer 12 is output to a sorter 18, the sorter for output destination being designated by the sorter address tmp_sort_adrs. FIG. 14 is a flowchart showing an image processing mode setting routine. In this routine, at a step for setting the image processing mode at step S7 in FIG. 4 to the status file_status within the image management record, a bit B_PIX_PRN_SORT signifying the image output to a designated sorter is set up (step S182). Subsequently, an output request bit B_PIX_PRT_REP of the memory box report is set up in the status file_status within the image management record (step S183).

If the setting of designating the output sorter of the recording sheet is ended, the recording is performed in accordance with the record task routine of FIGS. 6 and 7 which is periodically activated.

As described above, with the facsimile apparatus and its communication control method of this example, the sorter address which is an output destination of image can be simply set using the sub-address.

Figure 15:
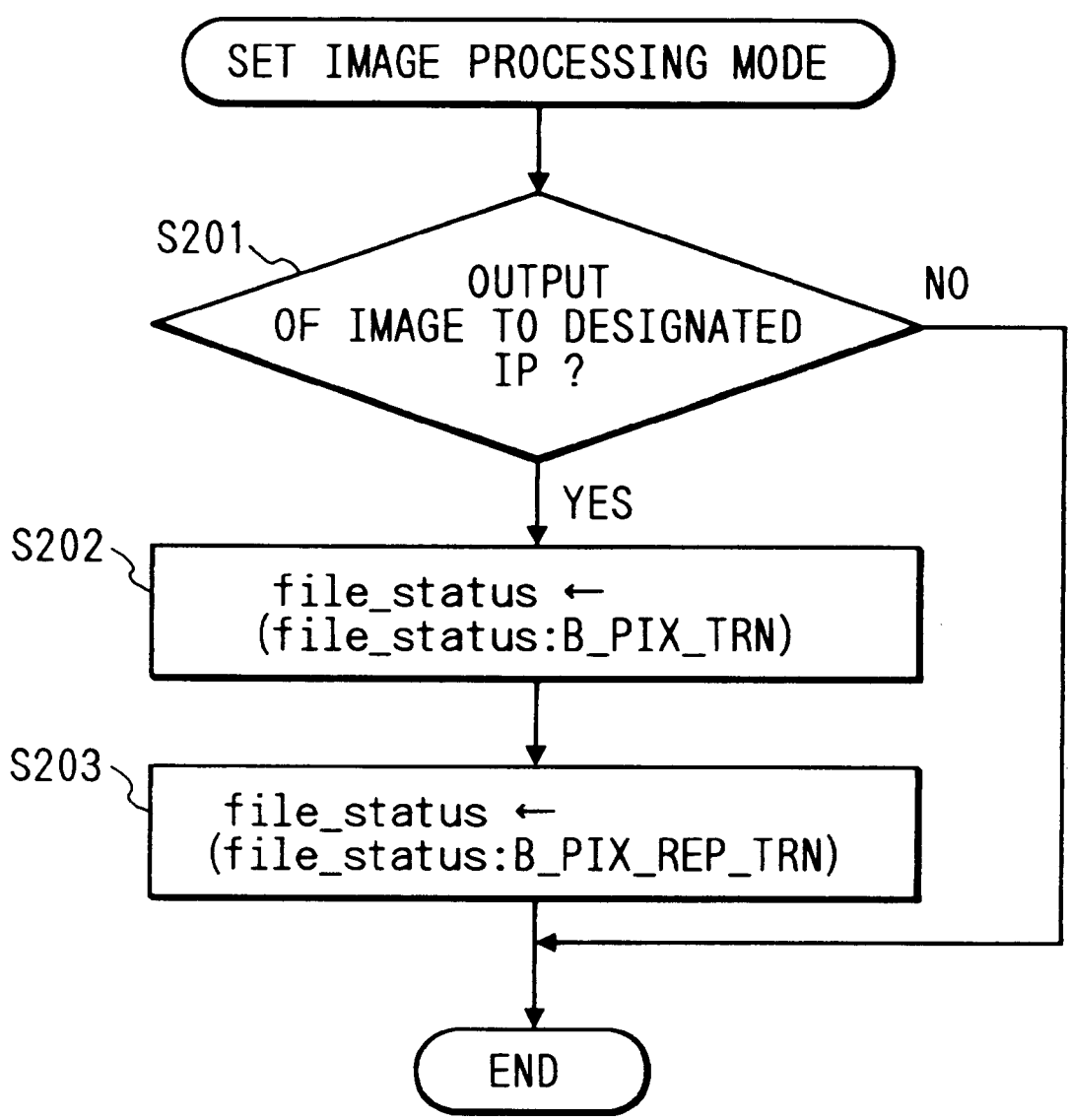
FIG. 15 is a flowchart showing an image processing mode setting routine.

Next, an operation command analysis wherein the operation command within the sub-address received is to output the image to the computer having a designated IP address will be described below. FIG. 15 is a flowchart showing an image processing mode setting routine. In this routine, a process of reflecting the image processing mode at step S7 in FIG. 4 to the status file_status within the image management record is included.

The facsimile apparatus on the called side first determines whether or not the operation command number box_order picked up at step S6 in FIG. 4 is to output the image to the computer having a designated IP address (step S201), and if it is not to output the image to the computer having the designated IP address, this routine is ended, or otherwise, the program goes to step S202.

At step S202, the bit B_PIX_TRN signifying the transmission of image is set up in the status file_status. And the transmission request bit B_PIX_REP_TRN of communication result report signifying the image transmission result is set up in the status file_status within the image management record (step S203), and the setting of the image processing mode is ended.

Thereafter, the image is sent out to the computer having the designated IP address in the communication task of FIGS. 8 and 9.

As described above, with the facsimile apparatus and its communication control method of this example, the output of image to the apparatus such as a computer designated by the IP address can be simply accomplished using the sub-address.

EXAMPLE 2

An example 2 of the invention will be described below with reference to the drawings.

Figure 16:
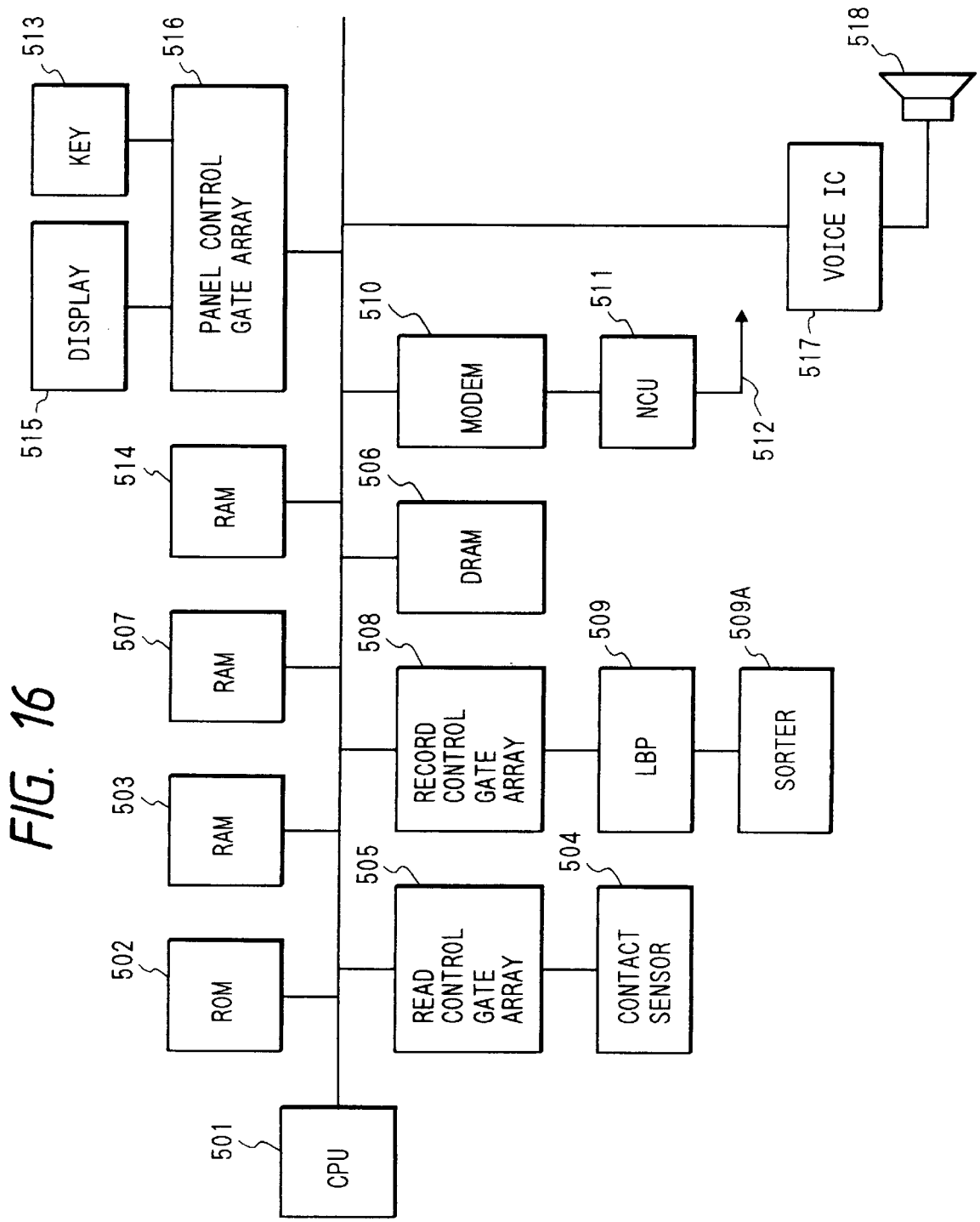
FIG. 16 is a block diagram showing the schematic configuration of an example of a facsimile apparatus according to the present invention.

FIG. 16 is a block diagram showing the schematic configuration of the example of a facsimile apparatus according to the present invention.

In the figure, 501 is a central processing control unit (CPU) for controlling the whole of the apparatus in accordance with the contents of programs (including a program as shown in a flowchart of FIGS. 17 and 18 as hereinafter described) stored in a ROM 502. A RAM 503 is used as the work area as required. An original is read by a contact sensor 504, compressed and encoded through a read control gate array 505, and stored in an image memory (DRAM: dynamic RAM) 506. Then, the management information such as a reception number, destination information, the number of pages, stored image memory block information, and an operation command (attribute) is stored in a RAM 507 (image management record). Herein, each of the RAM 507 and the image memory 506 is divided into a plurality of blocks as the memory block, the information of each memory block being managed by a management record (RAM 507). And the memory box consists of a memory block and a management record.

The image stored in the image memory 506 is expanded and decoded by a record control gate array 508, and printed on the recording sheet by a laser printer 509, the recording sheets being sorted by a sorter 509A. Also, the image stored in the image memory 506 is digital-to-analog modulated (PM-AM modulation) by a modulator-demodulator (MODEM) 510, and then sent to the communication line 512 through an NCU (Network Control Unit) 511 for switching the line.

Also, the received image data is input through the NCU 511 into the modem 510 for the demodulation, expanded and decoded, and checked for image error. As a result of checking, if it is correct, the received image is compressed and encoded, and stored in the image memory 506. Then, the image management information is stored in the RAM 507.

Moreover, the operator can make a variety of designations or settings by depressing a key 513, wherein its content is held in a RAM 514, and can be confirmed on a display unit 515 such as a liquid crystal display (LCD). The CPU 501 detects input data from the key 513 via a panel control gate array 516 and displays necessary data on the display 515, as well as sending an output signal to a voice IC 517 based on the information of RAMs 503, 507, 514, to output the voice from a speaker 518.

Next, a communication operation of this example using a sub-address function or a password function which is an additional function of CCITT recommendation/T.30 will be described below.

Figure 17:
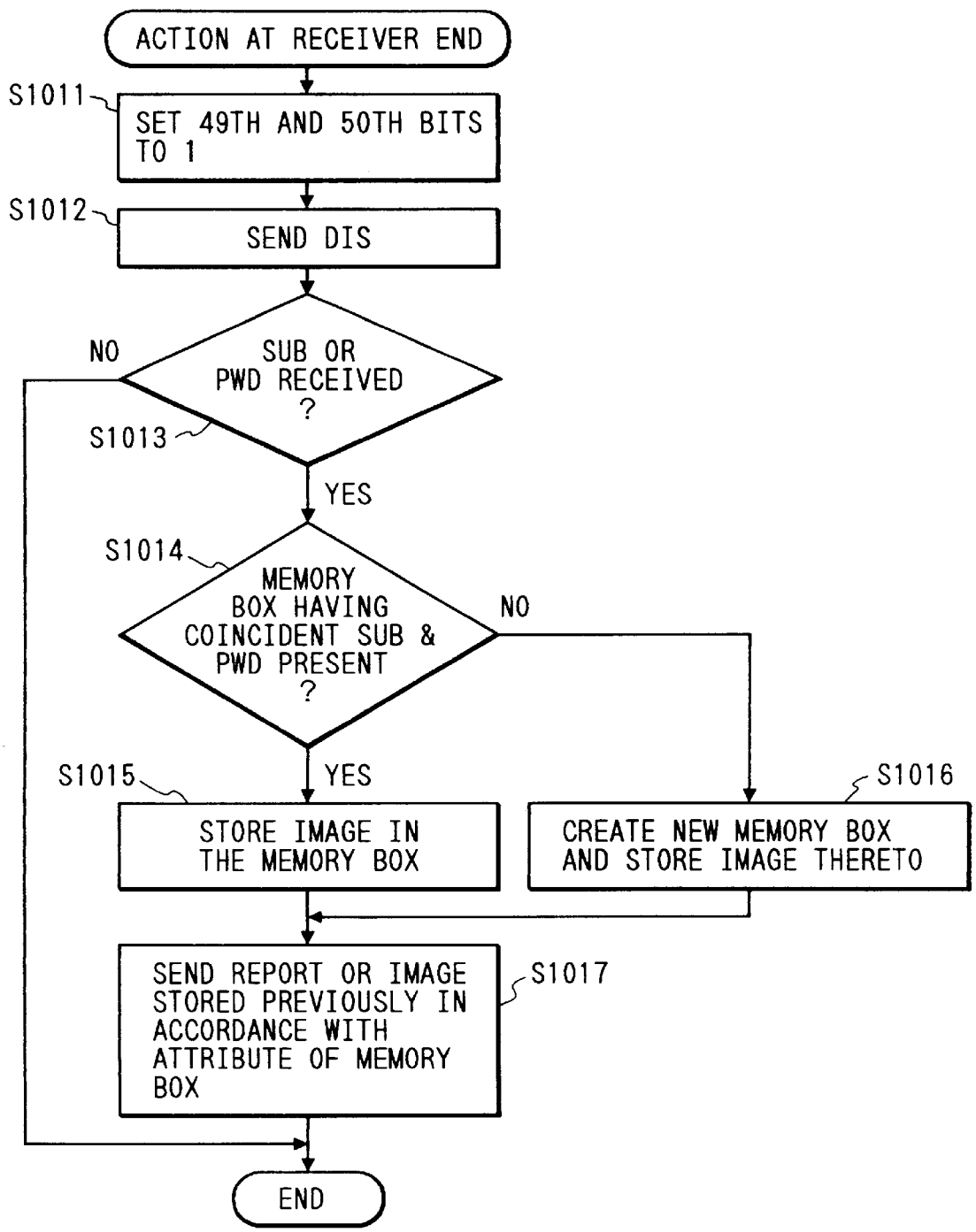
FIG. 17 is a flowchart showing the operation on the image receiver end.

FIG. 17 is a flowchart showing the operation on the image receiver end in this example.

First, in the execution of a facsimile communication protocol, to declare the presence of the sub-address function or password function to the calling side, a bit 49 or bit 50 of DIS (initial identification signal) is set to "1" (step S1011), and this DIS is sent out to the calling side (step S1012). Herein, the DIS represents a standard CCITT capability on the receiver end, and is composed in a predetermined format, the bit 49 indicating the sub-address capability and the bit 50 indicating the password capability.

Thereafter, the program waits for the sub-address (SUB) or password (PWD) which the caller sends out and a DCS (digital command signal: digital setting command responding to the standard function identified by the DIS), and determines whether or not the sub-address or password has been received (step S1013). If neither the sub-address nor the password is received, this flow is ended, and the program transfers to a normal procedure following the DCS reception.

If either or both of the sub-address and the password is or are received, a check is carried out to establish whether or not a sub-address and password coincident with its sub-address and password is present in the registered memory box (step S1014). If present, the sent image is stored in the memory box (step S1015), or if not present, a new memory box having registered the sub-address and the password which have been sent is created, the image being stored in this memory box as created (step S1016).

And when the attribute of the memory box indicates the content of "sending a report or previously stored image back to the partner station", for example, the sub-address and password of the memory box as well as the report such as a transmission report or the previously stored image are sent back to the partner station in accordance with the attribute of this memory box (step S1017), and this flow is ended.

FIG. 18 is a flowchart showing the operation on the image sender end in this example.

First, the DIS is received from the facsimile apparatus on the receiver end to check to determine whether or not the bit 49 or bit 50 is set to "1" (step S1021).

When the bit 49 or bit 50 is "1", the image with a predetermined sub-address or password is sent to the receiver end (step S1022). That is, since the bit 49 indicates the sub-address capability or the bit 50 indicates the password capability, as previously described, the image with the sub-address or password is sent accordingly. Each of the sub-address and the password is constituted of a 20-digit number (20 bytes).

Also, if neither the bit 49 nor the bit 50 is "1", the DCS is sent in accordance with the normal procedure.

Note that if both the bit 49 and the bit 50 are "1", the sub-address can be only sent with the image, or the password only sent with the image.

Thereafter, in accordance with the attribute of the memory box corresponding to the sub-address or password which the partner station has received, the report or previously stored image, for example, is received (step S1023), and this flow is ended.

In this way, with this example, the received image can be stored in a predetermined memory box on the receiver end using the sub-address/password, and the report such as a transmission report or previously stored image, for example, can be sent back to the partner station in accordance with the attribute registered in each memory box.

It should be noted that the present invention is not limited to the above example, but various variations can be made. For example, this example was described with the content of "sending a report or previously stored image back to the partner station" as the attribute of the memory box, but the content of the attribute can be set arbitrarily, and no data may be sent back to the partner station depending on the content.

EXAMPLE 3

The present invention will be described below in detail based on an example 3 as shown in the drawings.

Figure 19B:
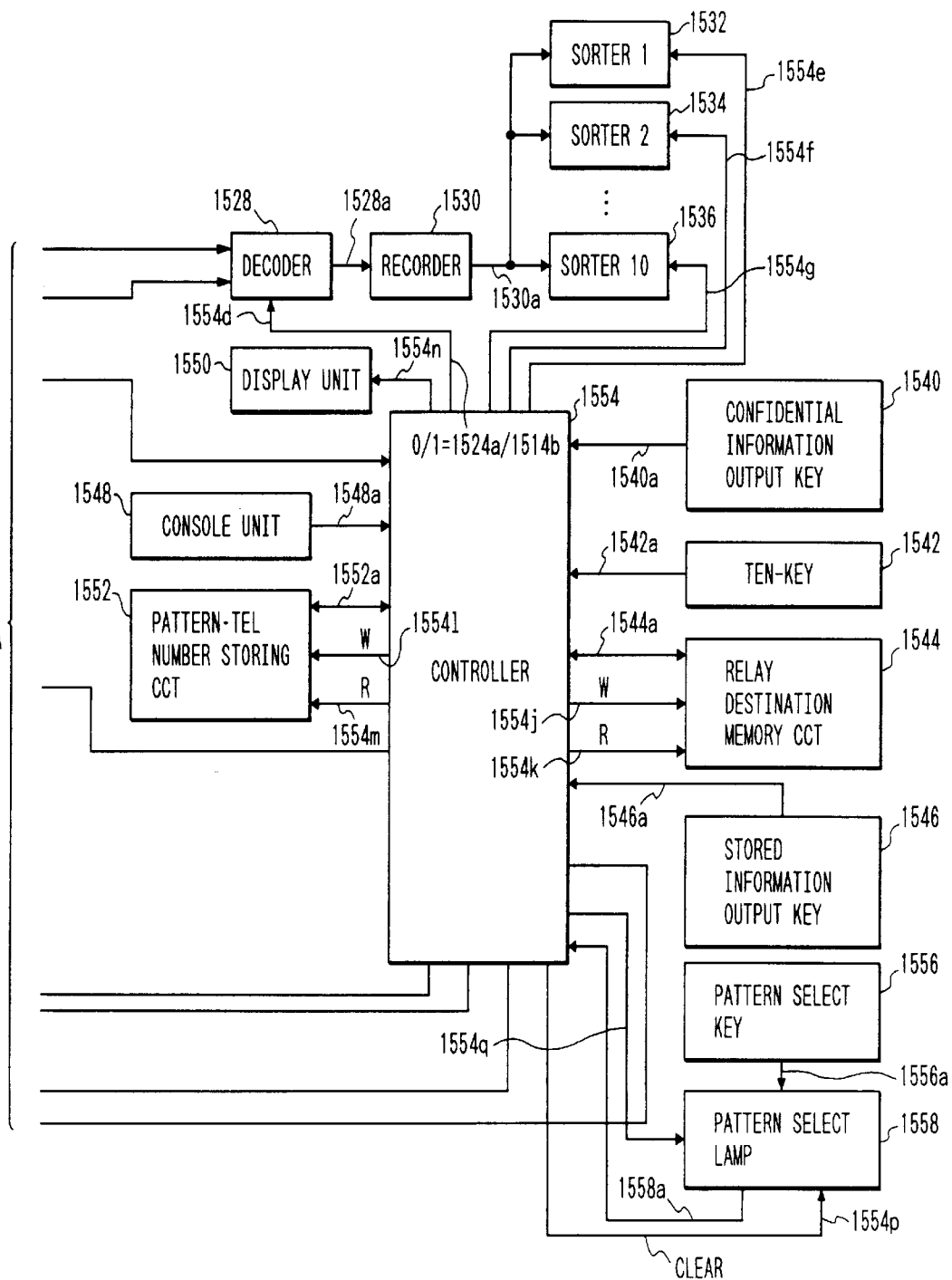
FIG. 19 is comprised of FIGS. 19A and 19B and show block diagrams of an example 3 of a facsimile apparatus.

FIGS. 19A and 19B show block diagrams of the example of a facsimile apparatus of the invention.

In FIGS. 19A and 19B, 1502 is a network control unit (NCU), which is connected to a terminal on the line to utilize a telephone network for data communication, the NCU controlling the connection of the telephone exchange network, switching the line to the data communication path or holding the loop. A signal line 1502a is a telephone line. The NCU 1502 inputs a signal on a signal line 1554, wherein if this signal level is "0", the NCU 1502 connects the telephone line to the telephone side, i.e., the signal line 1502a to a signal line 1502b. Also, the NCU 1502 inputs a signal on a signal line 1554a, wherein if this signal level is "1", the NCU 1502 connects the telephone line to the facsimile apparatus side, i.e., the signal line 1502a to a signal line 1502c. In the normal state, the telephone line is connected to the telephone side.

1504 is a telephone set. 1506 is a hybrid circuit for separating between the signal of a sender system and the signal of a receiver system. That is, the transmission signal on the signal line 1520 is sent through a signal line 1502c via the NCU 1502 into the telephone line. Also, the signal sent from the partner station is passed via the NCU 1502 through the signal line 1502c to be output into a signal line 1506a.

1508 is a modulator for make the modulation on the basis of a well-known CCITT recommendation V21. The modulator 1508 inputs a procedure signal of a signal line 1554b, and makes the modulation to output the modulated data to a signal line 1508a.

1510 is a reader circuit for sequentially reading an image signal of one line in a main scan direction from an original transmitted to create a series of signals representing the binary value of black and white. This circuit is composed of an image pickup device such as a CCD (charge coupled device) and an optical system. Such series of signals binarized in black and white is output to a signal line 1510a.

1512 is an encoder circuit for inputting read data which has been output to the signal line 1510a and encoding the data with (MH (Modified Huffman) coding) or (MR (Modified READ) coding) for the output to a signal line 1512a.

1514 is a memory circuit for storing the coded data output to the signal line 1512a under the control of the signal line 1554c, or outputting the coded data stored therein to the signal line 1514a under the control of the signal line 1554c. Also, the memory circuit 1514 stores the coded data output to a signal line 1526a under the control of the signal line 1554c, or outputs the coded data stored therein to a signal line 1514b under the control of the signal line 1554c.

1516 is a decoding/variable magnify/encoding circuit for inputting the coded data output to the signal line 1514a, decoding it as required, and variably magnifying it to output the information encoded to the signal line 1516a again.

1518 is a modulator for making the modulation on the basis of a well-known CCITT recommendation V27ter (differential phase modulation) or V29 (quadrature modulation). The modulator 1518 inputs a signal on the signal line 1516a, modulates it, and outputs modulated data to a signal line 1518a.

1520 is an adder circuit for inputting a signal on the signal line 1508a and a signal on the signal line 1518a, and outputting an added result to the signal line 1520a.

1522 is a demodulator for making the demodulation on the basis of a well-known CCITT recommendation V21. The demodulator 1522 inputs a signal on the signal line 1506a, and makes the demodulation of V21 to output demodulated data to a signal line 1522a.

1524 is a demodulator for making the demodulation on the basis of a well-known CCITT recommendation V27ter (differential phase modulation) or V29 (quadrature modulation). The demodulator 1524 inputs a signal on the signal line 1506a, and makes the demodulation to output demodulated data to a signal line 1524a.

1526 is a decoder/encoder circuit for inputting the demodulated data output to the signal line 1524a, decoding it once, and outputting the MR coded data with K=8 to the signal line 1526a again.

1528 is a decoder circuit for inputting the information output to the signal line 1524a when the signal with a signal level of "0" is output to a signal line 1554d, or inputting the information output to the signal line 1514b when the signal with a signal level of "1" is output to the signal line 1554d, and outputting decoded data with MH (Modified Huffman) or MR (Modified READ) to a signal line 1528a.

1530 is a recorder circuit for recording every line sequentially by inputting the signal which has been output to the signal line 1528a.

1532 is a sorter 1 which stores the record information which has been output to a signal line 1530a when the signal with a signal level of "1" is output to a signal line 1554e, or does not store the record information which has been output to the signal line 1530a when the signal with a signal level of "0" is output to the signal line 1554e.

1534 is a sorter 2 which stores the record information which has been output to the signal line 1530a when the signal with a signal level of "1" is output to a signal line 1554f, or does not store the record information which has been output to the signal line 1530a when the signal with a signal level of "0" is output to the signal line 1554f.

1536 is a sorter 10 which stores the record information which has been output to the signal line 1530a when the signal with a signal level of "1" is output to a signal line 1554g, or does not store the record information which has been output to the signal line 1530a when the signal with a signal level of "0" is output to the signal line 1554g.

1538 is a calling circuit for inputting the telephone number information which has been output to a signal line 1554h and outputting a selection signal to the signal line 1502c, when a calling instruction pulse occurs on a signal line 1554i.

1540 is an output button for use in outputting the confidentially received information, a depressed pulse being output to a signal line 1540a, when the button is depressed. After the button is depressed, a password is input by depressing a ten-key 1542.

1542 is a ten-key, the ten-key information depressed being output to a signal line 1542a.

1544 is a relay destination memory circuit for temporarily storing the relaying partner designated by the sub-address information. When the relaying partner is registered in the circuit 1544, the telephone number information (e.g., 03-3758-2111) is output to a signal line 1544a, and then a write pulse is generated in a signal line 1554j. On the other hand, when reading the information registered in the circuit 1544, a read pulse is generated in a signal line 1554k. Thus, the telephone number information registered in the circuit 1544 (e.g., 03-3758-2111) is output to the signal line 1544a.

1546 is an output button for the information stored in memory, which button is depressed in outputting the memory-received information. If the button is depressed, a depressed pulse is generated in a signal line 1546a.

1548 is a console unit, equipped with a one-touch key, an abbreviated dial, various function keys, a spec registration button corresponding to the sub-address, and a dial information set button corresponding to the sub-address, the information-depressed by any of them being output to a signal line 1548a.

1550 is a display unit for inputting and displaying the information which has been output to a signal line 1554n.

1552 is a circuit for registering a plurality of patterns for the sub-address information and the partner's telephone numbers for controlling respective patterns. For example, a 10-digit pattern can be registered. When registering in the circuit 1552, the pattern number (e.g., any of 0 to 9, for example, 2), a space, the sub-address usage (e.g., relaying, and partner designation (e.g., 03-3758-1111), a space, and the pattern, with lower 6 digits of the partner's telephone number to control (e.g., 112233, 111222, 112222, 112345), are output to the signal line 1552a, and then a write pulse is generated in the signal line 1554. On the other hand, when reading the information registered in the circuit 1552, the pattern number (e.g., 2) is output to the signal line 1552a, and then a read pulse is generated in a signal line 1554m. By doing so, the information registered corresponding to a pattern 2 (e.g., relaying, 03-3758-1111, a space, lower 6 digits of the partner's telephone number, 112233, 111222, 111122, 112222, 112345) is output to the signal line 1554m. Herein, it is considered with this example that the designation of the sub-address from a partner with pattern 0 involves designating a sorter for outputting the record image information, the designation of the sub-address from a partner with pattern 1 involves effecting a confidential reception or memory reception depending on the way of designation, and the designation of the sub-address from a partner with pattern 2 involves transferring the received information to the partner designated by the sub-address information, or with the self station, controlling the received information to be printed out and then transferred to the partner designated by the sub-address information, depending on the way of designation.

1554 is a control circuit for mainly making the control based on a pattern in such a manner as to determine the pattern for the control based on the partner's telephone number information if a telephone number has been detected for each pattern, wherein for the control based on the sub-address information, there are provided a plurality of patterns (pattern 0 is a designation of the sorter output position (from 1 to 10), pattern 1 is a designation of the memory reception or confidential reception (0 is memory reception, or 1 is confidential reception), pattern 2 is a transfer of the received information (only transferred if the first byte is 0, or output with the self station as well if it is 1, with a transfer destination in the second byte and downwards)). Herein, the SUB signal is ignored when the sub-address signal (SUB) is received but the TSI signal is not received, or when the telephone number of the TSI signal is not registered in the partner's telephone number for the control based on the sub-address information.

Figure 20:
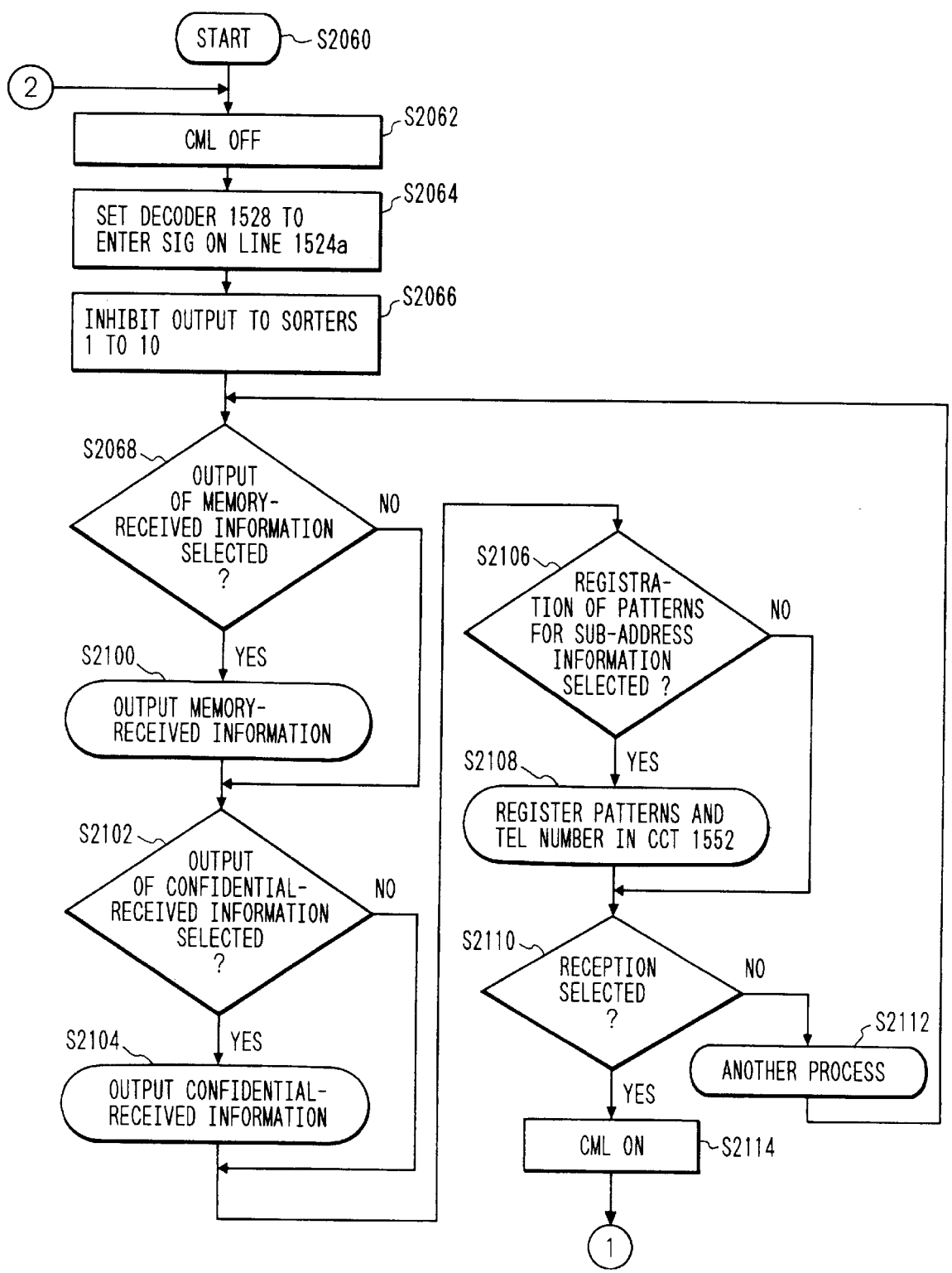
FIG. 20 is a flowchart of the control of a control circuit 1554 as shown in FIGS. 19A and 19B.
Figure 21B:
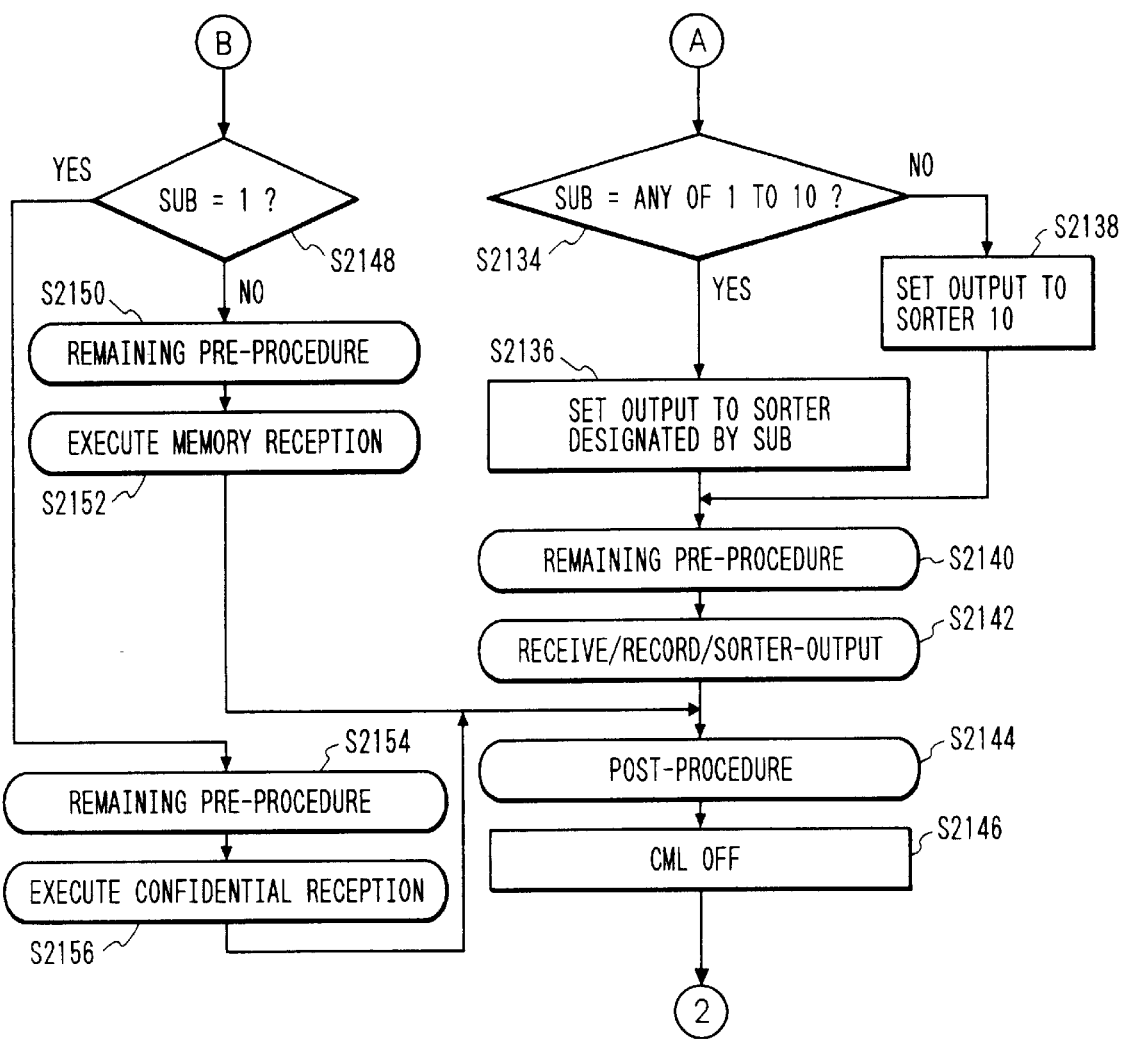
FIG. 21 is comprised of FIGS. 21A and 21B and show flowcharts of the control of the control circuit 1554 as shown in FIGS. 19A and 19B.
Figure 22:
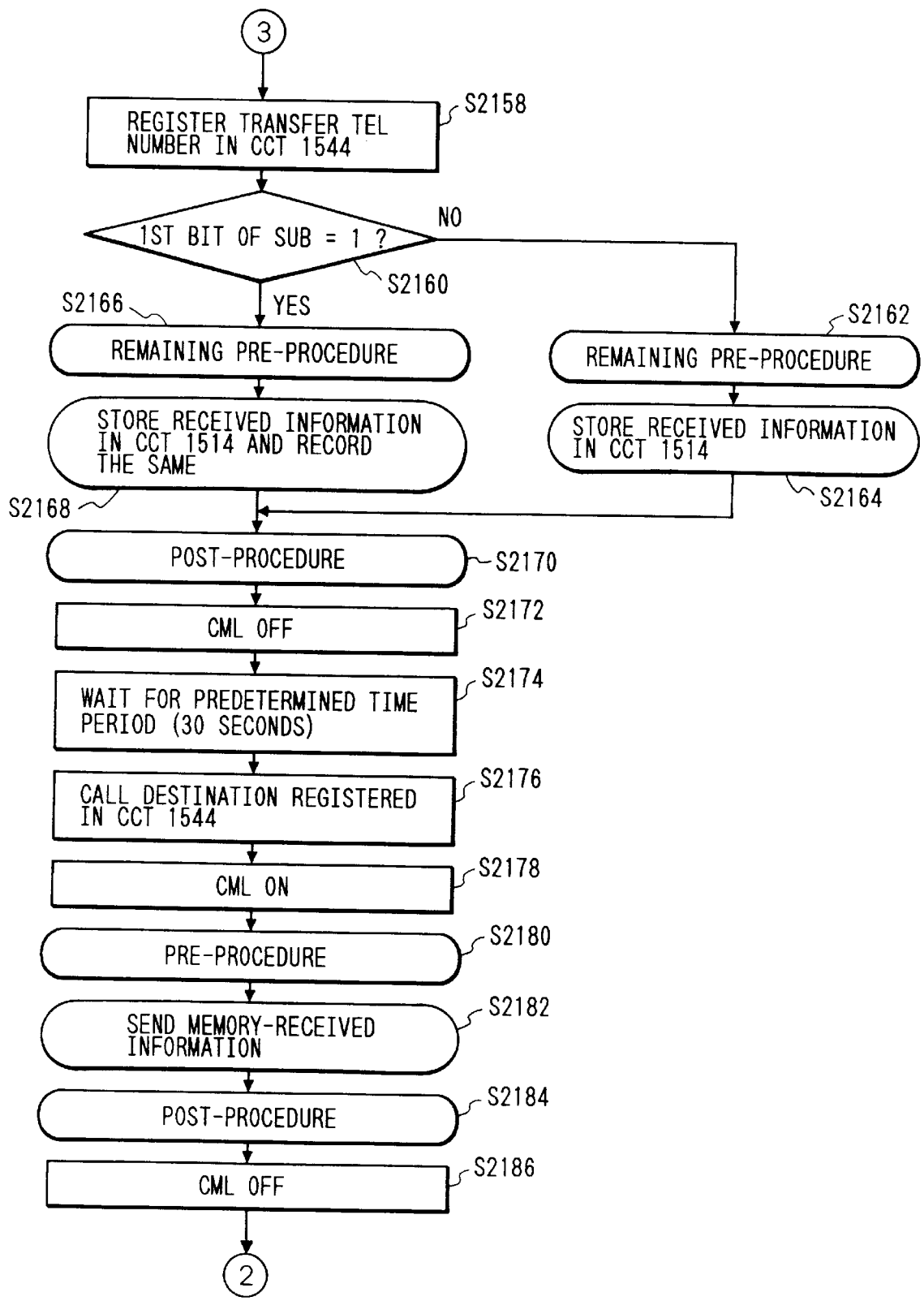
FIG. 22 is a flowchart of the control of the control circuit 1554 as shown in FIGS. 19A and 19B.

FIGS. 20 to 22 shows a flowchart of the control with the control circuit 1554 as shown in FIGS. 19A and 19B.

In FIG. 20, step S2060 represents the start.

At step S2062, the signal with a signal level of "0" is output to the signal line 1554a, and CML is turned off.

At step S2064, the signal with a signal level of "0" is output to the signal line 1554d, and the decoder circuit 1528 is set to input the signal of the signal line 1524a.

At step S2066, the signal with a signal level of "0" is output to the signal lines 1554e, 1554f, 1554g, and not output to the sorters 1, 2, . . . , 10.

At step S2068, the signal of the signal line 1546a is input to check to determine whether or not the output of memory-received image is selected, and if selected, the program goes to step S2100 to output the memory-received information via the signal line 1554c to the memory circuit 1514. Herein, the signal with a signal level of "1" is output to the signal line 1554d. If not selected, the program goes to step S2102.

At step S2102, the signal of the signal lines 1540, 1542 is input to check to determine whether or not the output of confidential received information is selected, and if selected, the program goes to step S2104 to output the confidential received information via the signal line 1554 to the memory circuit 1514. Herein, the signal with a signal level of "1" is output to the signal line 1554d. If not selected, the program goes to step S2106.

At step S2106, the information of the signal line 1548a is input to check to determine whether or not the registration of the sub-address information pattern is selected, and if selected, the program goes to step S2108 to register the spec corresponding to the pattern of the sub-address and its partner's telephone number in the circuit 1552. If not selected, the program goes to step S2110.

At step S2110, a check is performed to determine whether or not the reception is selected, and if the reception is selected, the program goes to step S2114, or if it is not selected, the program goes to step S2112.

Step S2112 represents other processing.

At step S2114, the signal with a signal level of "1" is output to the signal line 1554a, and CML is turned on.

Step S2116 represents a pre-procedure.

At step S2118, a check is performed to determine whether or not the SUB signal is received, and if the SUB signal is received, the program goes to step S2128, or if it is not received, the program goes to step S2120.

Step S2120 represents a remaining pre-procedure.

Step S2122 represents the receiving and recording of an image signal.

Step S2124 represents a post-procedure.

At step S2126, the signal with a signal level of "0" is output to the signal line 1554a, and CML is turned off.

At step S2128, a check is performed to determine whether or not the TSI signal is received, and if the TSI signal is received, the program goes to step S2130, or if it is not received, the program goes to step S2120.

At step S2130, a check is performed to determine whether or not the lower 6-digit information of the TSI signal is registered in the circuit 1552, and if it is registered, the program goes to step S2132, or if it is not registered, the program goes to step S2120.

At step S2132, the control pattern based on the sub-address information is checked based on the TSI signal, wherein the program goes to step S2134 if it is pattern 0, goes to step S2148 if it is pattern 1, or goes to step S2158 if it is pattern 2.

At steps S2134 to S2146, the control for changing the output sorter position based on the sub-address signal is made. At step S2134, a check is performed to determine whether or not the value of the SUB signal lies from 1 to 10, and if it is from 1 to 10, the program goes to step S2136, or otherwise, the program goes to step S2138.

At step S2136, the record information is output via the signal lines 1554e, 1554f, 1554g to a sorter number designated by the SUB signal.

At step S2138, the record information is output via the signal lines 1554e, 1554f, 1554g to a sorter 10.

Step S2140 represents a remaining pre-procedure.

Step S2142 represents the receiving, recording and output of an image signal to the designated sorter.

Step S2144 represents a post-processing.

At step S2146, the signal with a signal level of "0" is output to the signal line 1554a, and CML is turned off.

At steps S2148 to S2156, the control for making memory reception or confidential reception with the sub-address information is made.

At step S2148, a check is performed to determine whether or not the SUB signal is 1, and if it is 1, the program goes to step S2156, or otherwise, the program goes to step S2150.

Step S2150 represents a remaining pre-procedure.

Step S2152 represents storing the received information via the signal line 1554c in the memory circuit 1514 to effect the memory reception.

Step S2154 represents a remaining pre-procedure.

Step S2156 represents storing the received information via the signal line 2154 in the memory circuit 1514 to effect the confidential reception.

At steps S2158 to S2186, the information is transferred to a partner designated by the sub-address information, and the control of whether to record the received information with the self station is made, based on the sub-address information.

At step S2158, the information of the SUB signal following the second byte is input, and the telephone number to be transferred is registered in the circuit 1544.

At step S2160, a check is performed to determine whether or not the first byte of the SUB signal is 1, and if it is 1, the program goes to step S2166, or if it is not 1, the program goes to step S2162.

Step S2162 represents a remaining pre-procedure.

Step S2164 represents storing the received information via the signal line 1554c in the memory circuit 1514.

Step S2166 represents a remaining pre-procedure.

Step S2168 represents storing the received information via the signal line 1554c in the memory circuit 1514, as well as recording the received information.

Step S2170 represents a post-procedure.

At step S2172, the signal with a signal level of "0" is output to the signal line 1554a, and CML is turned off.

At step S2174, the program waits for a predetermined period, e.g., 30 seconds.

At step S2176, the partner registered in the circuit 1544 is called by a calling circuit 1538.

At step S2178, the signal with a signal level of "1" is output to the signal line 1554, and CML is turned off.

Step S2180 represents a pre-procedure.

Step S2182 represents sending the memory-received information at step S2164 or S2168 via the signal line 1554c.

Step S2184 represents a post-procedure.

At step S2186, the signal with a signal level of "0" is output to the signal line 1554a, and CML is turned off.

EXAMPLE 4

In the example 3 as previously described, it has been conceived that when the SUB signal is received but the TSI signal is not registered in the circuit 1552, or when the TSI signal is not received, no control is made based on the sub-address information. In this case, however, a particular pattern, e.g., pattern 0, may be employed for the control.

Figure 23:
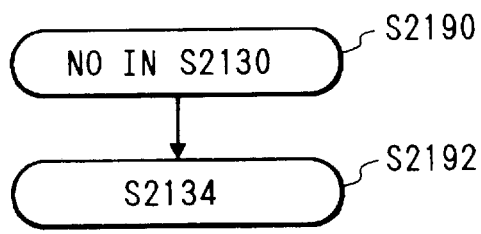
FIG. 23 is a flowchart of an example 4.

A specific example of the control as above is shown in FIG. 23, in which this control flowchart is different from that of FIG. 21.

In FIG. 23, step S2190 represents No at step S2130 in FIG. 21.

Step S2192 represents a step S2134 in FIG. 21.

EXAMPLE 5

It is conceived that with a plurality of patterns for the control and with means for setting a pattern for the control by means of a circuit 1556, the control may be made based on the settings of a circuit 1558 when the sub-address information is received.

Herein, the circuit 1556 is a button for use in selecting one of the plurality of patterns, and if the button is depressed, a depressed pulse is generated in the signal line 1556a.

1558 is a pattern selection lamp for displaying pattern 0 if a clear pulse is generated in the signal line 1554p, the pattern number being incremented every time the pulse is generated in the signal line 1556a, and returned to pattern 0 if the pattern number exceeds the number output to the signal line 1554q. Herein, the maximum value of the pattern number registered in the circuit 1552 is output to the signal line 1554q. Also, the circuit 1558 outputs the pattern number being currently displayed to the signal line 1558a.

Figure 24:
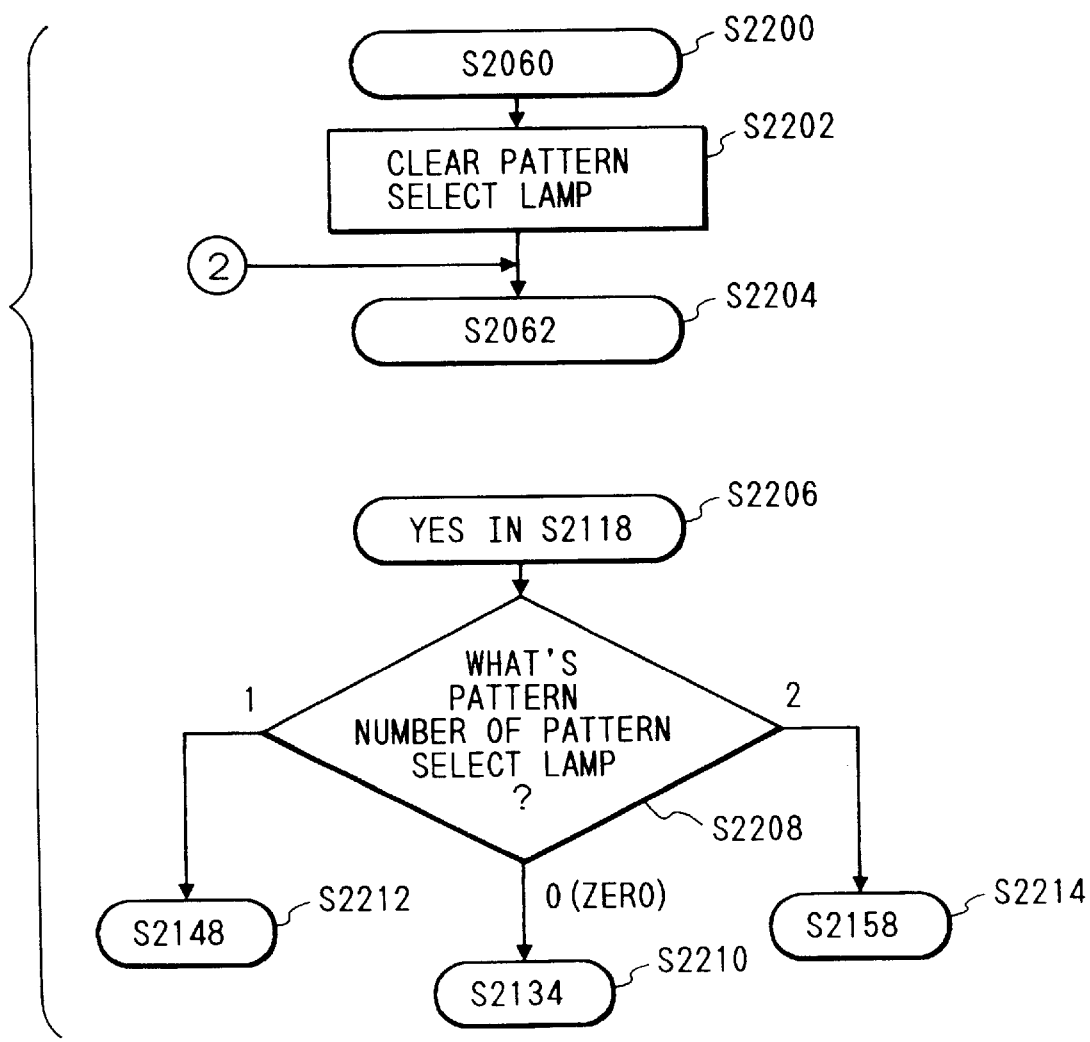
FIG. 24 is a flowchart of an example 5.

A specific example of the control as above is shown in FIG. 24, in which this control flowchart is different from that of FIGS. 20 to 22.

In FIG. 24, step S2200 represents step S2060 in FIG. 20.

At step S2202, a clear pulse is generated in the signal line 1554p, and the pattern selection lamp 1558 displays pattern 0.

Step S2206 represents step S2062 in FIG. 20.

Step S2206 represents Yes at step S2118 in FIG. 3.

At step S2208, the signal on the signal line 1558a is input to check for the pattern selection lamp 1558, wherein the program goes to step S2210 (FIG. 21B, step S2134) if it is pattern 0, goes to step S2210 (FIG. 21B, step S2148) if it is pattern 1, or goes to step S2214 (FIG. 22, step S2158) if it is pattern 2.

As described above, the sub-address information having significant degree of freedom can be used for a plurality of patterns through the information of the transmission partner or the operator's selection on the receiver end, which allows the sub-address information to be effectively used.

EXAMPLE 6

An example 6 will be described below in detail.

Figure 25B:
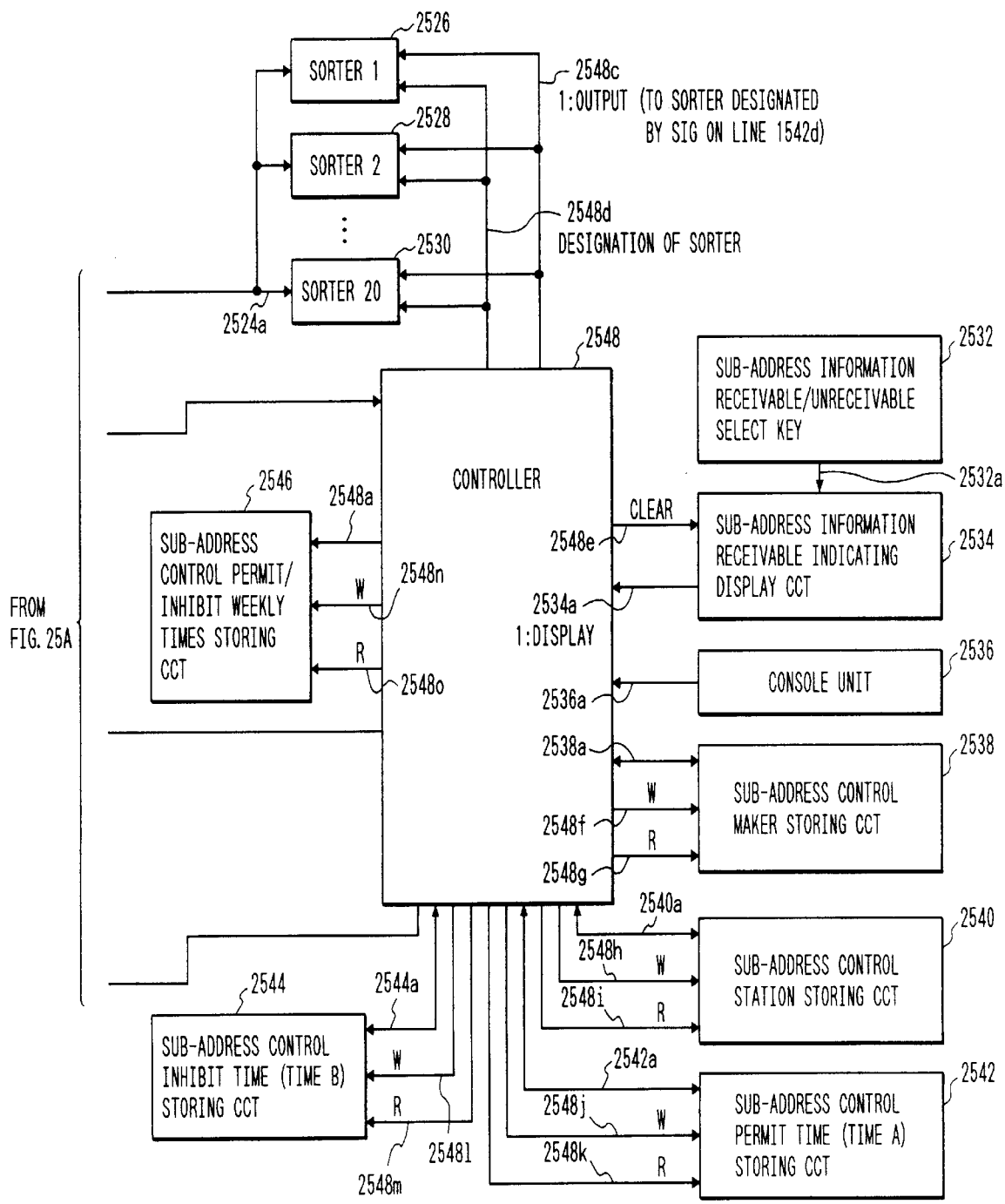
FIG. 25 is comprised of FIGS. 25A and 25B and show block diagrams of an example 6.

FIGS. 25A and 25B show block diagrams of a facsimile apparatus of the example 6.

In the drawings, 2502 is a network control unit (NCU), which is connected to a terminal on the line to utilize a telephone network for the data communication, the NCU controlling the connection of a telephone exchange network, switching the line to the data communication path or holding the loop. A signal line 2502a is a telephone line. The NCU 2502 inputs a signal on a signal line 2548a, wherein if this signal level is "0", the NCU 2502 connects the telephone line to the telephone side, i.e., the signal line 2502a to a signal line 2502b. Also, the NCU 2502 inputs a signal on a signal line 2548a, wherein if this signal level is "1", the NCU 2502 connects the telephone line to the facsimile apparatus side, i.e., the signal line 2502a to a signal line 2502c. In the normal state, the telephone line is connected to the telephone side.

2504 is a telephone set. 2506 is a hybrid circuit for separating between the signal of a sender system and the signal of a receiver system. That is, the transmission signal on the signal line 2516a is sent through a signal line 2502c via the NCU 2502 into the telephone line. Also, the signal sent from the partner station is passed via the NCU 2502 through the signal line 2502c to be output into a signal line 2506a.

2508 is a modulator for making the modulation on the basis of a well-known CCITT recommendation V21. The modulator 2508 inputs a procedure signal of a signal line 2548b, and makes the modulation to output the modulated data to a signal line 2508a.

2510 is a reader circuit for sequentially reading an image signal of one line in a main scan direction from an original transmitted to create a series of signals representing the binary value of black and white. This circuit is composed of an image pickup device such as a CCD (charge coupled device) and an optical system. Such series of signals binarized in black and white is output to a signal line 2510a.

2512 is an encoder circuit for inputting read data which has been output to the signal line 2510a and encoding the data with (MH (Modified Huffman) coding) or (MR (Modified READ) coding) for the output to a signal line 2512a.

2514 is a modulator for making the modulation on the basis of a well-known CCITT recommendation V27ter (differential phase modulation) or V29 (quadrature modulation). The modulator 2514 inputs a signal on the signal line 2512a, modulates it, and outputs modulated data to a signal line 2514a.

2516 is an adder circuit for inputting a signal on the signal line 2508a and a signal on the signal line 2514a, and outputting an added result to the signal line 2516a.

2518 is a demodulator for making the demodulation on the basis of a well-known CCITT recommendation V21. The demodulator 2518 inputs a signal on the signal line 2506a, and makes the demodulation of V21 to output demodulated data to a signal line 2518a.

2520 is a demodulator for making the demodulation on the basis of a well-known CCITT recommendation V27ter (differential phase modulation) or V29 (quadrature modulation). The demodulator 2520 inputs a signal on the signal line 2506a, and makes the demodulation to output demodulated data to a signal line 2520a.

2522 is a decoder circuit for inputting the signal which has been output to the signal line 2520a, and outputting decoded data with MH (Modified Huffman) or MR (Modified READ) to a signal line 2522a.

2524 is a recorder circuit for recording every line sequentially by inputting the signal which has been output to the signal line 2522a.

2526 to 2530 are sorters, e.g., bins consisting of sorter 1 to sorter 20. In this example, it is conceived that the output sorter position is designated based on the sub-address information. For example, with the 20-digit sub-address signal, if 1 is designated, the received information is stored in sorter 1, and in sequence, if 2, 3, 4, . . . 19 is designated, the received information is stored in sorter 2, sorter 3, sorter 4, . . . , and sorter 19. Further, if the number equal to or greater than 20 is designated, or the SUB signal is not transmitted, the received information is stored in sorter 20.

Herein, 2526 is sorter 1, 2528 is sorter 2, and 2530 is sorter 20. The received information is stored in a sorter designated by the signal line 2548d when the signal with a signal level of "1" is output to a signal line 2548c, or is not stored when the signal with a signal level of "0" is output to the signal line 2548c.

2532 is a switch button for switching the sub-address information to be effective or ineffective by selecting whether or not to send out a DIS signal indicating that the sub-address information is receivable, wherein upon depressing the button, a depressed pulse is generated in the signal line 2532a.

2534 is an indicator circuit for indicating whether or not to send out the DIS signal indicating that the sub-address information is receivable, wherein the sending is effective if the sub-address information is received. The indicator circuit 2534 lights on an indicator when a clear pulse is generated in a signal line 2548e, and thereafter the lighting on and off of the indicator is repeated every time the depressed pulse is generated in the signal line 2532a. Also, the circuit 2534 outputs the signal with a signal level "1" to the signal line 2534a when the indicator is lighted on, or outputs the signal with a signal level "0" to the signal line 2534a when lighted off.

2536 is a console unit having a ten-key, a one-touch dial key, an abbreviated dial key, a start key, a variety of function keys, and a variety of registration keys, and if any of the above keys is depressed, the information depressed is output to the signal line 2536a.

2538 is a maker storage circuit for storing the makers having control based on the sub-address information. The makers having control based on the sub-address information can be stored up to 20, for example. When a maker having control based on the sub-address information is registered in the circuit 2538, a registration number (any of 1 to 20, e.g., 1), a space, and its maker code (e.g., 21H) are output to a signal line 2538a, and then a line pulse is generated in a signal line 2548f. Also, when reading the information stored in the circuit 2538, the registration number (e.g., 1) is output to the signal line 2538a, and then a read pulse is generated in a signal line 2548g. By doing so, the maker code (e.g., 21H) registered corresponding to the registration number is output to the signal line 2538a.

2540 is a circuit for storing a particular partner for effecting the control based on the sub-address information. The particular partner for effecting the control based on the sub-address information is designated with lower 6-digits of the telephone number information, and up to 20 destinations are accepted. When the particular partner for effecting the control based on the sub-address information is registered in the circuit 2540, a destination number (any of 1 to 20, e.g., 3), a space and the lower 6 digits of the telephone number (e.g., 221144) are output to a signal line 2540a, and then a write pulse is generated in a signal line 2548h. Also, when reading the information stored in the circuit 2540, the destination number (e.g., 3) is output to the signal line 2540a, and then a read pulse is generated in a signal line 2548i. By doing so, the lower 6 digits of the telephone number (e.g., 221144) registered corresponding to the destination number is output to the signal line 2540a.

2542 is a circuit for storing the time A when the control based on the sub-address information is made effective. When registering the time A in the circuit 2542, 18:00, for example, is output to a signal line 2542a, and then a write pulse is generated in a signal line 2548j. Also, when reading the time A registered in the circuit 2542, a read pulse is generated in a signal line 2548k. By doing so, the time A (e.g., 18:00) registered in the circuit 2542 is output to the signal line 2542a.

2544 is a circuit for storing the time B when the control based on the sub-address information is made ineffective. When registering the time B in the circuit 2544, 20:00, for example, is output to a signal line 2544a, and then a write pulse is generated in a signal line 2548l. Also, when reading the time B registered in the circuit 2544, a read pulse is generated in a signal line 2548m. By doing so, the time B (e.g., 20:00) registered in the circuit 2544 is output to the signal line 2544a.

2546 is a circuit for storing the time when the control based on the sub-address information is made effective corresponding to Monday to Sunday, and the time when it is made ineffective. When registering them in the circuit 2546, the day of the week information (1 for Monday, 2 for Tuesday, . . . and 7 for Sunday), a space, the time when the control is made effective (e.g., 7:00), a space, and the time when the control is made ineffective (e.g., 9:00) are output to a signal line 2546a, and then a write pulse is generated in a signal line 2548n. On the other hand, when reading the information registered in the circuit 2546, the day of the week information (e.g., 1) is output to the signal line 2546a, and then a read pulse is generated in a signal line 2548o. By doing so, the information registered in the circuit 2546 corresponding to the day of the week information, e.g., 7:00, a space, 9:00 is output to the signal line 2546a.

2548 is a control circuit for the facsimile apparatus which changes the output sorter position based on the sub-address information, upon receiving this information, the control circuit effecting the control in such a manner as to give notice of the sub-address function in terms of the DIS signal, and the changing function of the output sorter position with the designation of the SUB signal (sub-address signal) in terms of the NSF signal, and upon receiving a SUB signal and an NSS signal indicating that the control for changing the output sorter position with the designation of SUB signal is required, making the sub-address information effective to change the output sorter position based on the information, or upon not receiving the SUB signal or the NSS signal indicating that the control for changing the output sorter position with the designation of the SUB signal is required, ignoring the sub-address information to output the received information to the sorter 20.

Figure 26:
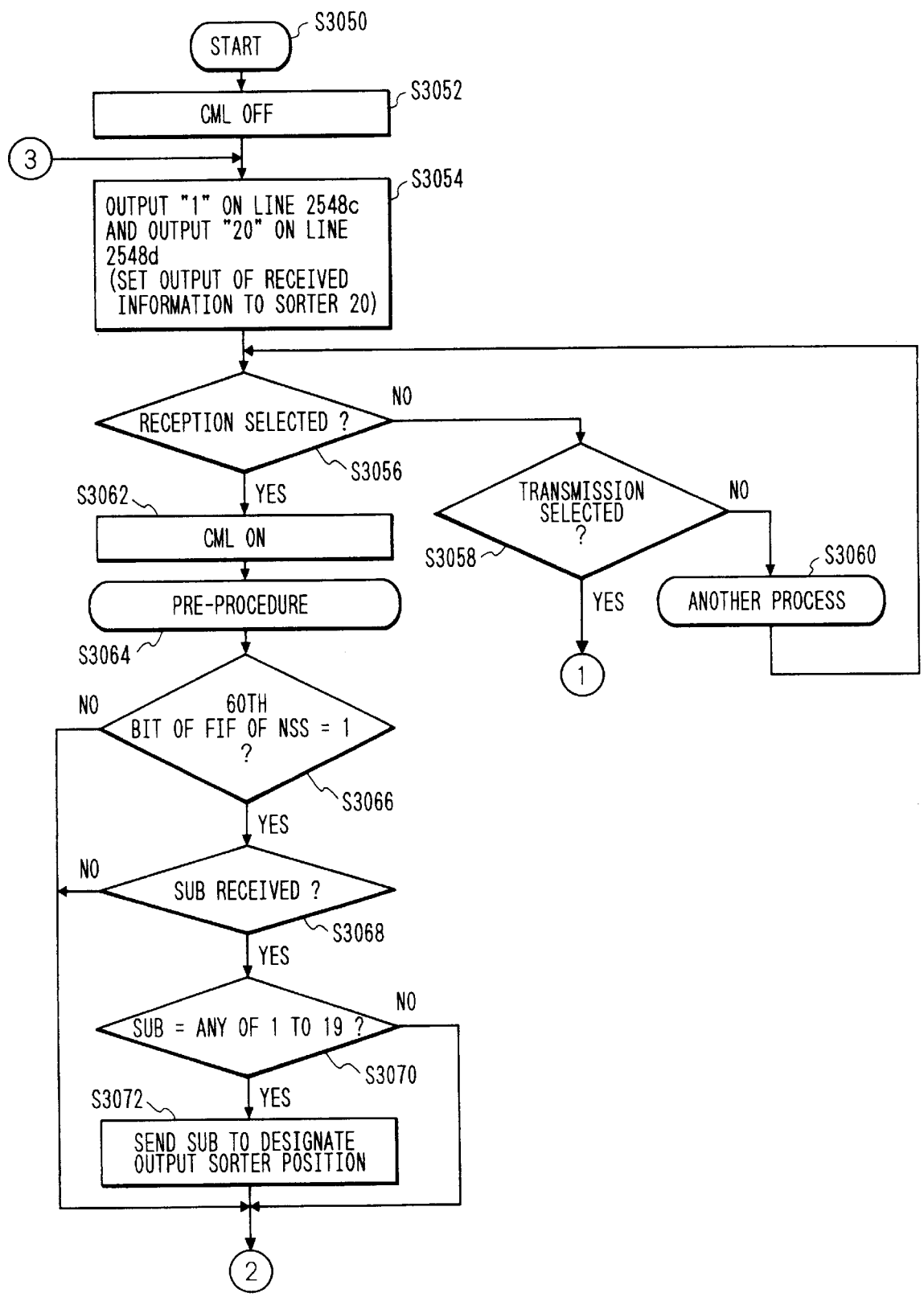
FIG. 26 is a flowchart of the control of a control circuit 2548 as shown in FIGS. 25A and 25B.

FIG. 26 is a flowchart of the control with a control circuit 2548 as shown in FIG. 25B.

In FIG. 26, step S3050 represents the start.

At step S3052, the signal with a signal lever of "0" is output to the signal line 2548a, and CML is turned off.

At step S3054, the signal with a signal level of "1" is output to the signal line 2548c, and further 20 is output to the signal line 2548d to output the received information to the sorter 20.

At step S3056, a check is performed to determine whether or the reception is selected, and if the reception is selected, the program goes to step S3062, or if the reception is not selected, the program goes to step S3058.

At step S3058, a check is performed to determine whether or not the transmission is selected, and if the transmission is selected, the program goes to step S3080, or if the transmission is not selected, the program goes to step S3060.

Step S3060 represents other processing.

At step S3062, the signal with a signal level of "1" is output to the signal line 2548a, and CML is turned on.

Step S3064 represents a pre-procedure. Herein, the 49-th bit of FIF of the DIS signal is set to 1, declaring that the receiving function of the sub-address exists, and the 60-th bit, for example, of FIF of the NSF signal is set to 1, notifying that the function of changing the output sorter position with the designation of the SUB signal sent from the sender exists.

At step S3066, a check is performed to determine whether or not the NSS signal signifying that the control for changing the output sorter position with the designation of the SUB signal is desired is received, by analyzing the information of the NSS signal sent from the partner station. Specifically, the 60-th bit of FIF of the NSS signal is checked. If the 60-th bit of FIF of the NSS signal is 1, the program goes to step S3068, or if it is 0, the program goes to step S3074.

At step S3068, a check is performed to determine whether or not the SUB signal is received, and if the SUB signal is received, the program goes to step S3070, or if it is not received, the program goes to step S3074.

At step S3070, the content of the SUB signal is checked, and if it is from 1 to 19, the program goes to step S3072, or if it is 0 or greater than 19, the program goes to step S3074.

At step S3072, the value of the SUB signal is output to the signal line 2548d to designate the output sorter position.

Step S3074 represents the receiving and recording of an image signal. The recorded information is stored in the designated sorter.

Step S3076 represents a post-procedure.

At step S3078, the signal with a signal level of "0" is output to the signal line 2548a, and CML is turned off.

At step S3080, the signal with a signal level of "1" is output to the signal line 2548a, and CML is turned on.

Step S3082 represents a pre-procedure.

At step S3084, a check is performed to determine whether or the 49-th bit of FIF of the DIS signal is 1 and the 60-th bit of FIF of the NSF signal is 1, that is, the function of changing the output sorter position with the designation of sub-address information exists, and if the response is affirmative, the program goes to step S3086, or if the response is negative, the program goes to step S3090.

At step S3086, a check is performed to determine whether or not the sorter position to output the received image in the partner receiver is designated from the operation unit, and if it is, the program goes to step S3088, or if it is not, the program goes to step S3090.

At step S3088, the 60-th bit of FIF of the NSS signal is set to 1 to notify that the control for changing the output sorter position with the designation of the SUB signal is required, and the SUB signal is sent out to designate the output sorter position.

At step S3090, the 60-th bit of FIF of the NSS signal is set to 0 not to notify that the control for changing the output sorter position with the designation of the SUB signal is required, and the SUB signal is not sent out.

Step S3092 represents a remaining pre-procedure.

Step S3094 represents the reading and sending of image signal.

Step S3096 represents a post-procedure.

At step S3098, the signal with a signal level of "0" is output to the signal line 2548a, and CML is turned off.

EXAMPLE 7

In contrast with the example 6, it is conceived that the function of storing the particular partner maker code is provided to analyze the NSS, wherein upon receiving from a particular maker, the sub-address information is made effective to change the sorter position to output the received information based on this sub-address information, or upon receiving from other than the particular maker, the sub-address information is ignored to output all the received information to the sorter 20.

Figure 27:
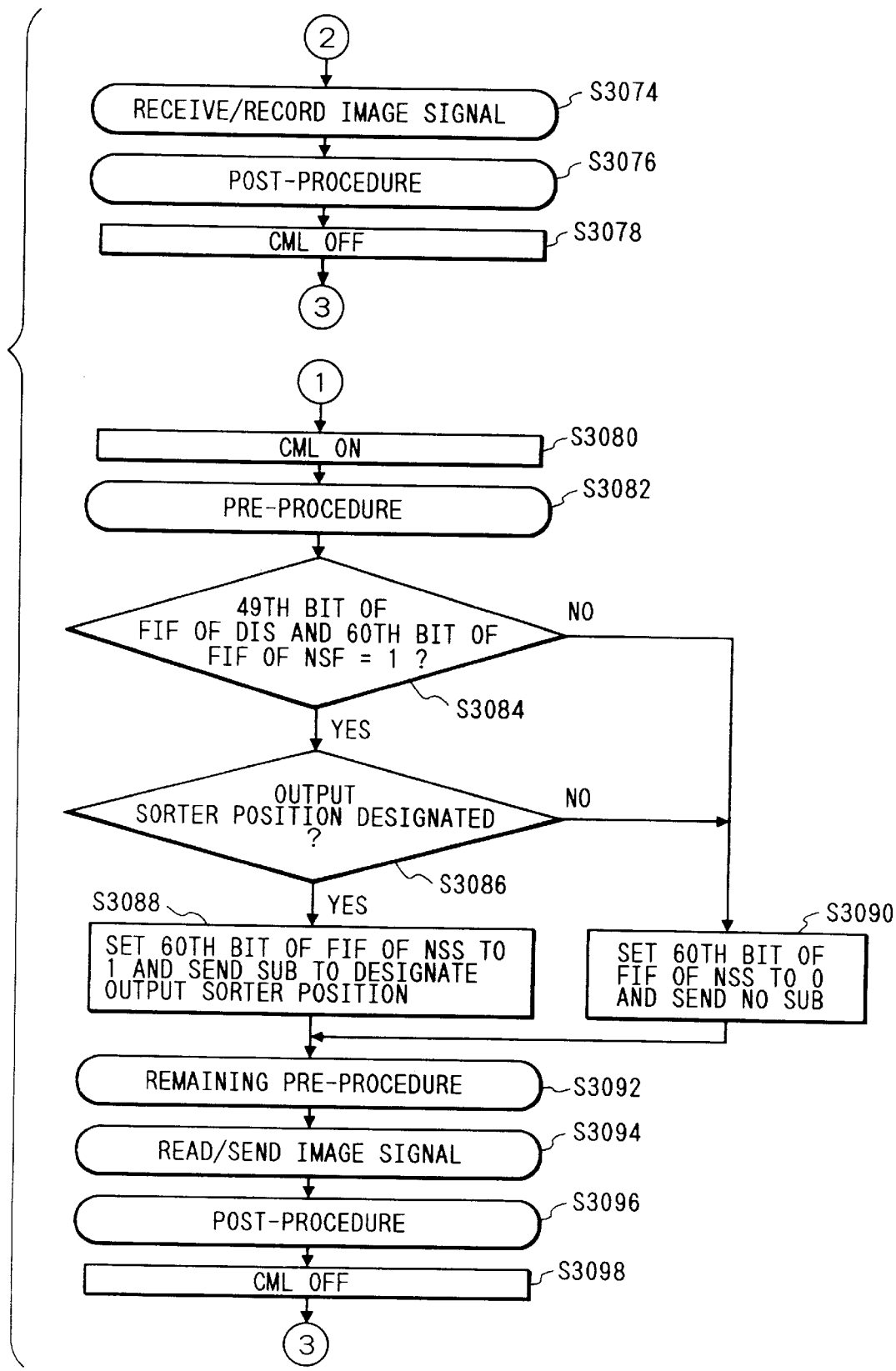
FIG. 27 is a flowchart of the control of the control circuit 2548 as shown in FIGS. 25A and 25B.
Figure 28:
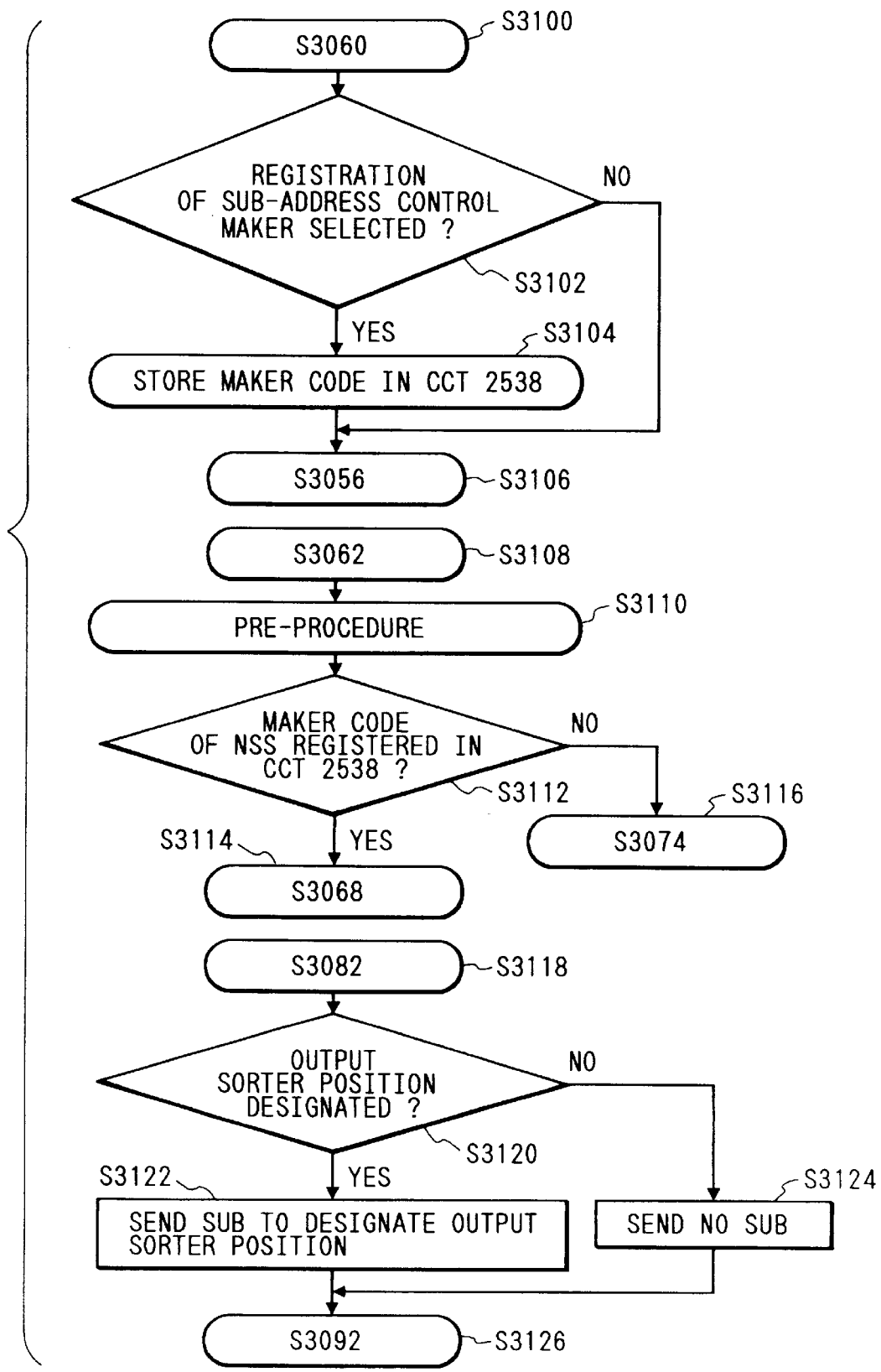
FIG. 28 is a flowchart of the control of the control circuit 2548 as shown in FIG. 25A and 25B.

A specific example of this control is shown in FIG. 28, the flowchart of which is concerned with a different control portion from that of FIGS. 26 and 27.

In FIG. 28, step S3100 represents step S3060 of FIG. 2.

At step S3102, a check is performed to determine whether or not the registration of the maker for making the control based on the sub-address information is selected via the console unit, and if selected, the program goes to step S3104, or if not selected, the program goes to step S3106.

Step S3104 represents storing the maker code for making the control based on the sub-address information in the circuit 2538.

Step S3106 represents step S3056 of FIG. 26.

Step S3108 represents step S3062 of FIG. 26.

Step S3110 represents a pre-procedure.

At step S3112, by analyzing a maker code of the NSS signal, a check is performed to determine whether or not this maker code is registered in the circuit 2538, and if it is registered, the program goes to step S3114, or if it is not registered, the program goes to step S3116.

Step S3114 represents step S3068 of FIG. 26.

Step S3116 represents step S3074 of FIG. 27.

Step S3118 represents step S3082 of FIG. 27.

At step S3120, a check is performed to determine whether or not the output sorter position is designated from the console unit, and if the output sorter position is designated, the program goes to step S3122, or if the output sorter position is not designated, the program goes to step S3124.

At step S3122, the output sorter position is designated with the SUB signal.

At step S3124, the no sending out of the SUB signal is set.

Step S3126 represents step S3092 of FIG. 27.

EXAMPLE 8

In the example 7, it has been considered that upon receiving from the particular maker, the sub-address information is made effective to change the sorter position to output the received information based on this sub-address information, while upon receiving from other than the particular maker, the sub-address information is ignored to output all the received information to the sorter 20. However, it will be appreciated that the function of storing the particular partner may be provided to analyze the TSI signal, wherein upon receiving from the particular partner, the sub-address information is made effective to change the sorter position to output the received information based on this sub-address information, while upon receiving from other than the particular partner, the sub-address information is ignored to output all the received information to the sorter 20.

Figure 29:
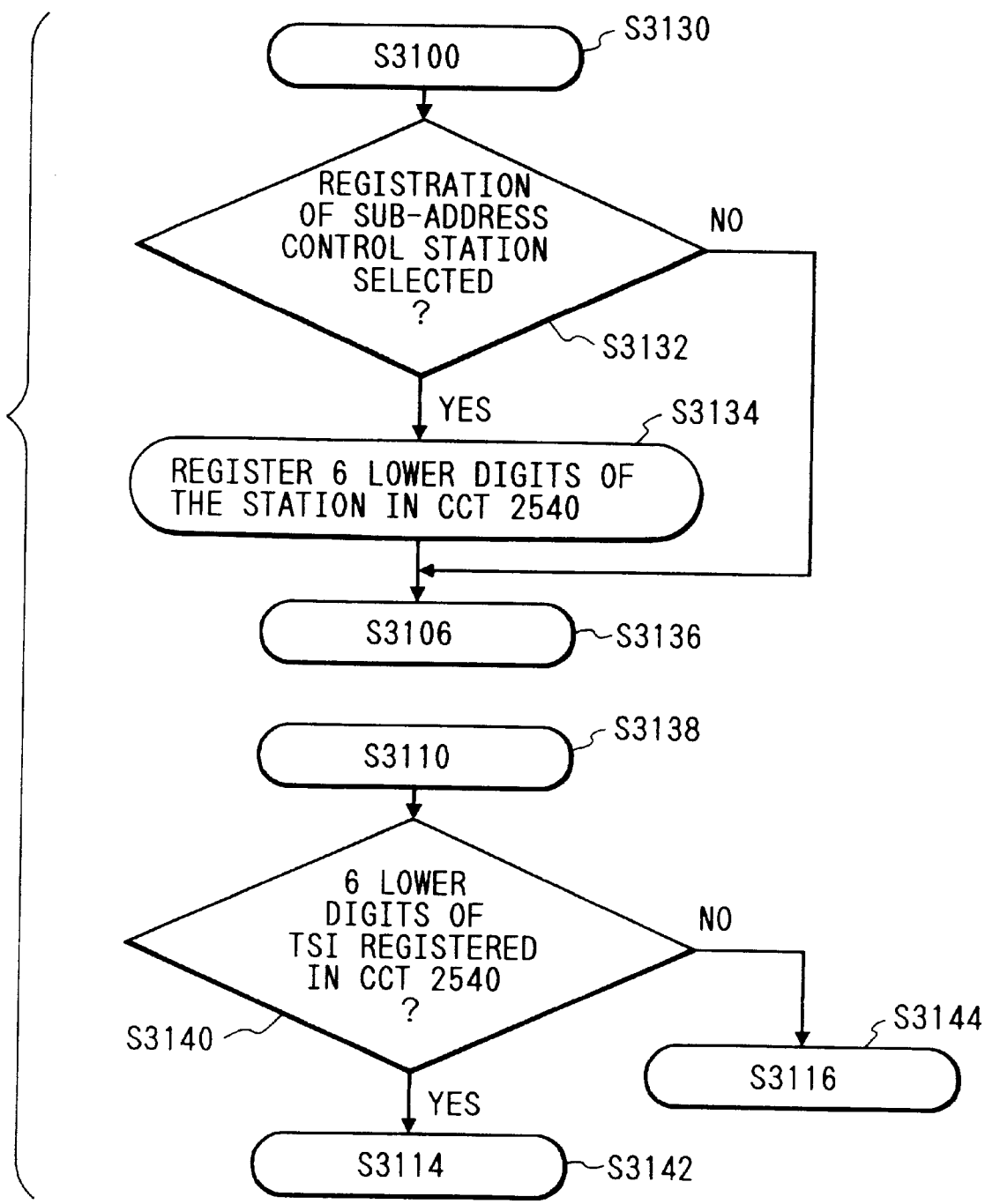
FIG. 29 is a flowchart of the control of the control circuit 2548 as shown in FIGS. 25A and 25B.

A specific example of this control is shown in FIG. 29, the flowchart of which is concerned with a different control portion from that of FIG. 28.

In FIG. 29, step S3130 represents step S3100 of FIG. 28.

At step S3132, a check is performed to determine whether or not the registration of the partner for making the control based on the sub-address information is selected via the console unit, and if selected, the program goes to step S3134, or if not selected, the program goes to step S3136.

Step S3134 represents registering the lower 6 digits of the partner for making the control based on the sub-address information in the circuit 2560.

Step S3136 represents step S3106 of FIG. 28.

Step S3138 represents step S3110 of FIG. 28.

At step S3140, the TSI signal is checked to determine whether or not the information of lower 6 digits is registered in the circuit 2540, and if it is registered in the circuit 2540, the program goes to step S3142, or if it is not registered in the circuit 2540, the program goes to step S3144.

Step S3142 represents step S3114 of FIG. 28.

Step S3144 represents step S3116 of FIG. 28.

EXAMPLE 9

It is conceived that with means for storing the time A when the sub-address information is made effective, and the time B when the sub-address information is made ineffective, if the current time is from A to B when the reception is selected, the sub-address information is made effective to change the sorter position to output the received information based on the sub-address information, while if the current time is from B to A, the sub-address information is ignored to output all the received information to the sorter 20.

Figure 30:
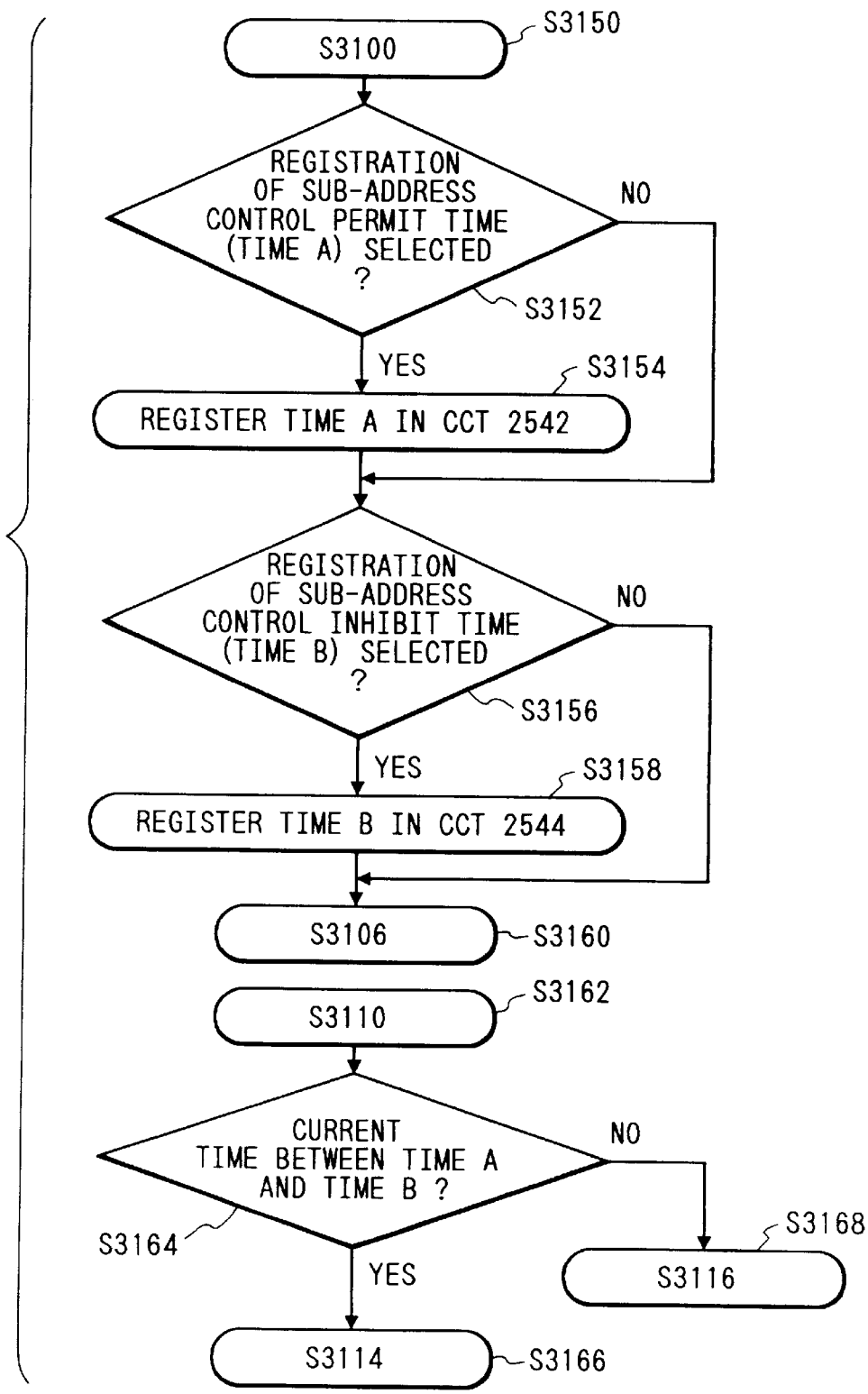
FIG. 30 is a flowchart of the control of the control circuit 2548 as shown in FIGS. 25A and 25B.

A specific example of this control is shown in FIG. 30, the flowchart of which is concerned with a different control portion from that of FIG. 28.

In FIG. 30, step S3150 represents step S3100 of FIG. 28.

At step S3152, a check is performed to determine whether or not the registration of the time A when the control based on the sub-address information is made effective is selected via the console unit, and if selected, the program goes to step S3154, or if not selected, the program goes to step S3156.

Step S3154 represents registering the time A when the control based on the sub-address information is made effective in the circuit 2542.

At step S3156, a check is performed to determine whether or not the registration of the time B when the control based on the sub-address information is made ineffective is selected, and if selected, the program goes to step S3158, or if not selected, the program goes to step S3160.

Step S3158 represents registering the time B when the control based on the sub-address information is made ineffective in the circuit 2544.

Step S3160 represents step S3106 of FIG. 28.

Step S3162 represents step S3110 of FIG. 28.

At step S3164, a check is performed to determine whether or not the current time is from the time A to the time B, and if it is from the time A to the time B, the program goes to step S3166, while if it is from the time B to the time A, the program goes to step S3168.

Step S3166 represents step S3114 of FIG. 28.

Step S3168 represents step S3116 of FIG. 28.

EXAMPLE 10

The concept of the day of the week may be added to the example 9. That is, the time when the sub-address information is made effective is stored for each day of the week, and the time when the sub-address information is made ineffective is stored for each day of the week, wherein when the reception is selected, the sub-address information based on the current time and day of the week is made effective to change the sorter position to output the received information based on the information, or the sub-address information is ignored to output all the received information to the sorter 20.

Figure 31:
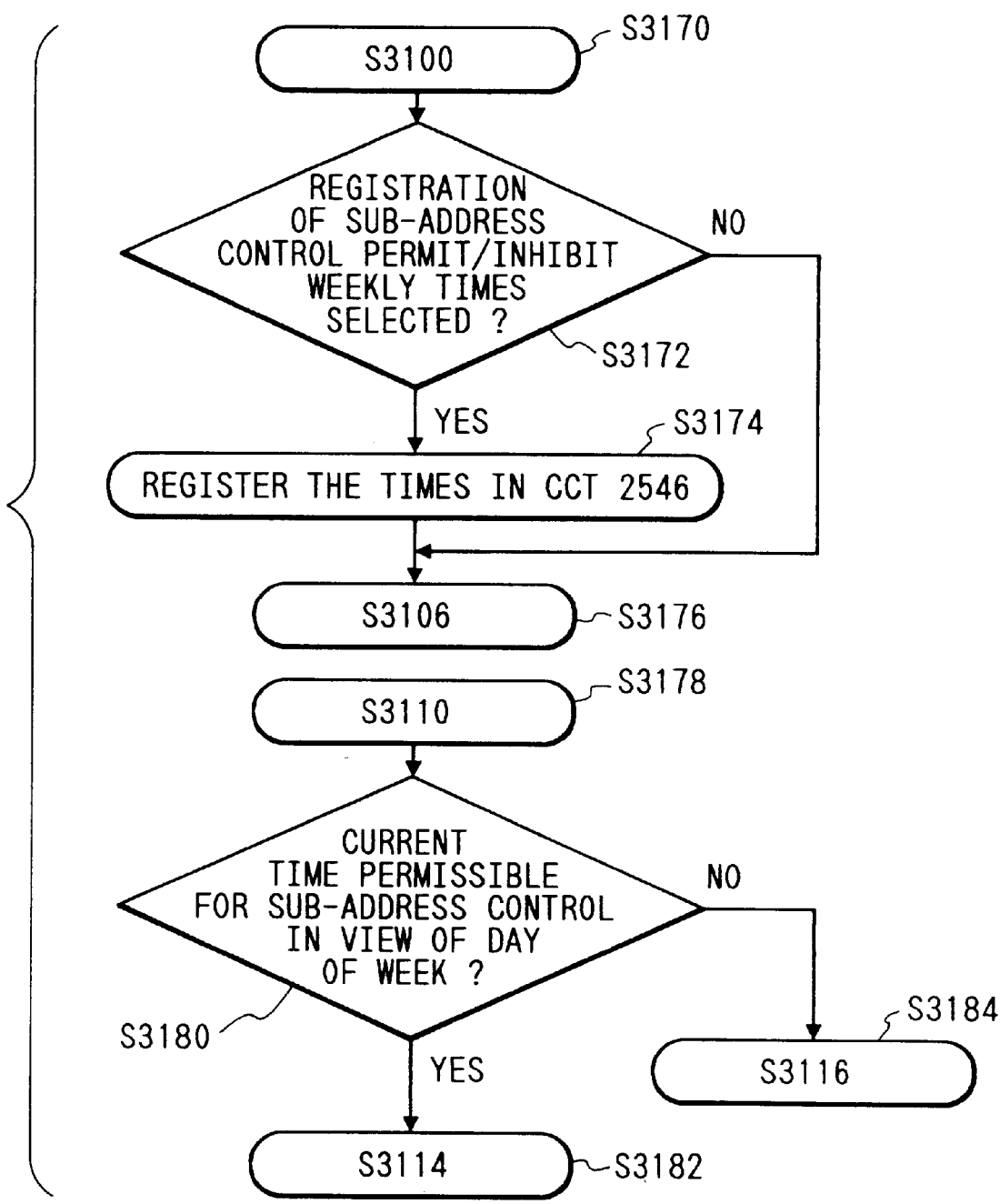
FIG. 31 is a flowchart of the control of the control circuit 2548 as shown in FIGS. 25A and 25B.

A specific example of this control is shown in FIG. 31, the flowchart of which is concerned with a different control portion from that of FIG. 28.

In FIG. 31, step S3170 represents step S3100 of FIG. 28.

At step S3172, a check is performed to determine whether or not the registration of the time when the sub-address information is made effective and the time when the sub-address information is made ineffective is selected, corresponding to the day of the week, via the console unit, and if the registration is selected, the program goes to step S3174 to register them in the circuit 2546, or if the registration is not selected, the program goes to step S3176.

Step S3176 represents step S3106 of FIG. 28.

Step S3178 represents step S3110 of FIG. 28.

At step S3180, a check is performed to determine whether or not the current time is the time when the sub-address information is made effective in view of the day of the week, by inputting the information of the circuit 2546, and if it is the time when the sub-address information is made effective, the program goes to step S3182, or if it is not the time when the sub-address information is made effective, the program goes to step S3184.

Step S3182 represents step S3114 of FIG. 28.

Step S3184 represents step S3116 of FIG. 28.

EXAMPLE 11

In the above examples, it has been considered that the 49-th bit of FIF of the DIS signal is 1 to provide the receiving capability of the sub-address function at any time. However, it will be appreciated that the receiving capability of the sub-address function may be selected with an operation from the outside.

Figure 32:
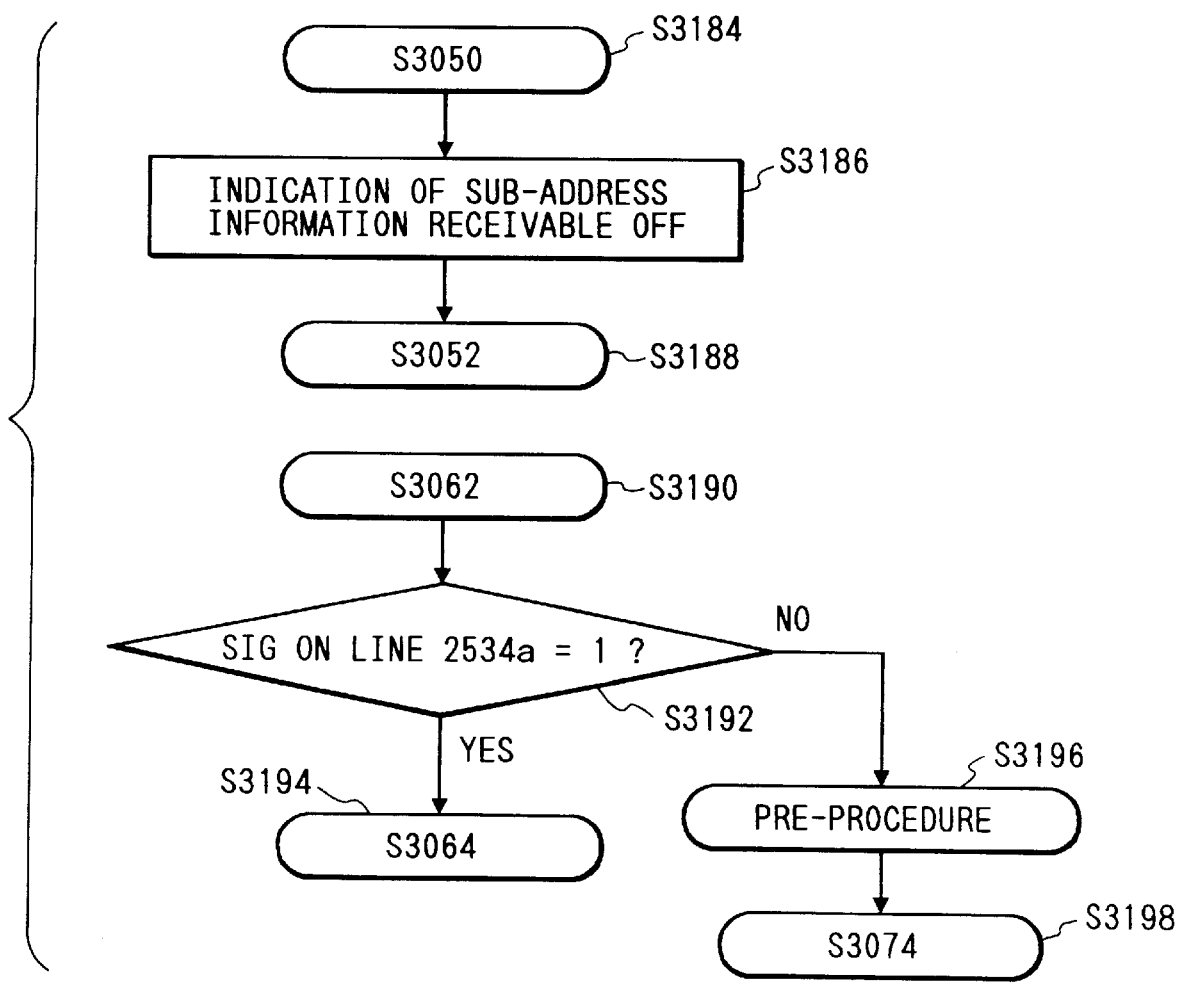
FIG. 32 is a flowchart of the control of the control circuit 2548 as shown in FIGS. 25A and 25B.

A specific example of this control is shown in FIG. 32, the control flowchart of which is different from that of FIGS. 26 and 27.

In FIG. 32, step S3184 represents step S3050 of FIG. 26.

At step S3186, a clear pulse is generated in the signal line 2548e to turn off an indicator of the indicator circuit 2534 to make the sub-address information effective upon receiving it.

Step S3188 represents step S3052 of FIG. 26.

Step S3190 represents step S3062 of FIG. 26.

At step S3192, a check is performed to determine whether or not the signal level of the signal line 2534a is "1", that is, an indicator circuit 2534 is lighted on to make the sub-address information effective upon receiving it, and if it is lighted on, the program goes to step S3194, or if it is lighted off, the program goes to step S3196.

Step S3194 represents step S3064 of FIG. 26.

Step S3196 represents a pre-procedure. Herein, the 49-th bit of FIF of the DIS signal and the 60-th bit of FIF of the NSF signal are set to 0 to send an NSF signal and a DIS signal to represent the receiving function of the sub-address information.

Step S3198 represents step S3074 of FIG. 27.

As described above, with the present invention, in the sub-address information which can be used in various ways, only when the setting of receiver can be equivalently made on the receiver end and on the sender end, the sub-address information can be received and the control based on the sub-address information can be effected, so that the sub-address information can be appropriately used without causing any malfunction.

What is claimed is:

1. A commnunication apparatus comprising:

receiving means for receiving image data;

sub-address signal receiving means for receiving a sub-address signal;

maker code discriminating means for discriminating a maker code in a standard procedure signal;

telephone number discriminating means for discriminating a telephone number of a sending partner; and processing means for carrying out one of a plurality of operations specified by a received sub-address signal, the specified operation being carried out, in dependence on the telephone number or maker code, to ensure that the communication apparatus carries out the specified operation even where the sending partner and said communication ascribe different operations to the sub-address signal itself.

2. An apparatus according to claim 1, wherein the sub-address signal includes a command-code, and said processing means carries out the specified operation in accordance with the command-code.

3. An apparatus according to claim 2, wherein the specified operation uses a parameter, and said sub-address signal includes an operation specifying command and the parameter.

4. An apparatus according to claim 1, further comprising operation storage means for storing operations corresponding to a plurality of sub-address signals.

5. An apparatus according to claim 4, wherein said operation storage means stores a respective operation for each sub-address signal.

6. An apparatus according to claim 1, wherein said processing means inhibits recording image data on a recording sheet based on the sub-address signal.

7. An apparatus according to claim 1, further comprising setting means for setting a time band, and time discriminating means for discriminating whether or not a time is within the time band set by said setting means, and wherein said processing means performs the specified operation in accordance with the received sub-address signal and the discrimination performed by said time discriminating means.

8. An apparatus according to claim 1, wherein said setting means sets said time band for each day of the week.

9. An apparatus according to claim 1, further comprising operation means for instructing said processing means to perform or inhibit the specified operation using the sub-address received with an operation of an operator.

10. An apparatus according to claim 1, further comprising storage means for storing the image data received by said receiving means, wherein said processing means processes the image data stored in said storage means in accordance with the sub-address signal.

11. An apparatus according to claim 10, further comprising sending means for sending the image data stored in said storage means, and wherein said processing means causes said sending means to send the image data stored in said storage means in accordance with the sub-address signal.

12. An apparatus according to claim 11, wherein said sending means sends the stored image data to an IP address corresponding to the sub-address signal.

13. An apparatus according to claim 11, wherein said sending means sends the stored image data to a telephone number corresponding to the sub-address signal.

14. an apparatus according to claim 1, further comprising recording means for recording on a recording paper the image data stored in said storage means, and sorter means for sorting the recording paper, and wherein said processing means causes said sorting means to change a bin of said sorter means in accordance with the sub-address signal.

* * * * *

UNITED STATES PATENT AND TRADEMARK OFFICE
CERTIFICATE OF CORRECTION

Page 1 of 2

PATENT NO. : 5,959,741
DATED : September 28, 1999
INVENTOR(S) : Takehiro Yoshida, et. al.

It is certified that error appears in the above-identified patent and that said Letters Patent is hereby corrected as shown below:

Column 1, line 10, delete "invent on" and insert-- invention--.

Column 4, lines 24-25, delete "temporarily set memory box management record" and insert therefor:

-- variable tmp_box_ no of a temporarily set memory box number (step S4). The operation retrieves for a memory box having, as a component, a memory box number box_no coincident with the memory box number stored in the variable tmp_box_no which the facsimile apparatus on the called side possesses (step S5).

Subsequently, the operation command number is picked up from the SUB (sub-address), and stored in a variable box_order showing the operation command number which is a component of the memory box (step S6). Further, the image processing mode is stored in the status file_status within the image management record to correspond to the operation command number stored in the variable box_order (step S7).

The format of necessary data may differ depending on the operation command number stored in the variable box_order. First, a check is performed to determine whether or not the operation command data is a telephone number such as a one-touch or abbreviated number (step S8). If so, the data is stored in the dial map dial_bit_map in the form of map (step S9). If not, a check is performed to see whether or not the operation command data is a sorter address (step S10). If the operation command data is the sorter address, the sorter address is stored in a sorter address map sort_bit_map in the form of map (step S11). If the operation command data is not the sorter address, a check is performed to see whether or not the operation command data is an IP address (step S12). If so, the operation command data is stored in an IP address map ip_bit_map in the form of bit map (step S13). If not, the operation command data is checked to determine whether or not it is a telephone number (step S14). If the operation command data is

UNITED STATES PATENT AND TRADEMARK OFFICE
CERTIFICATE OF CORRECTION

PATENT NO. : 5,959,741
DATED : September 28, 1999
INVENTOR(S) : Takehiro Yoshida, et. al.

It is certified that error appears in the above-identified patent and that said Letters Patent is hereby corrected as shown below:

not the telephone number, its telephone number is stored in the dial buffer dial_buf (step S15).
If the operation command data is not the telephone number, this routine is ended.

Thereafter, in accordance with a normal communication control procedure, the image communication is made. The image thus sent and information on the image are stored in an image storing area for each memory box number and the image management record. --

Column 5, line 62, delete "ip_bit map" and insert therefor -- ip_bit_map --.

Column 6, delete line 66 through column 7, line 41, and insert therefor:

-- On the other hand, if the 49-th bit is "1" at the step S121, the sub-address (SUB) registered in accordance with the above-mentioned sub-address registration routine is sent and then the digital command signal (DCS) is sent (step S122), by which this routine is ended. --

Column 13, line 36, delete "information-depressed" and insert therefor
-- information depressed --.

Column 14, line 25, delete "S2062," and insert therefor -- S2062, --.

Signed and Sealed this

Twenty-sixth Day of December, 2000

Q. TODD DICKINSON

*Attest:*

*Attesting Officer*  *Director of Patents and Trademarks*